United States Patent
Minakuchi et al.

(10) Patent No.: US 7,398,320 B1
(45) Date of Patent: Jul. 8, 2008

(54) INFORMATION DISTRIBUTION/REPRODUCTION CONTROL APPARATUS, INFORMATION DISTRIBUTION/REPRODUCTION CONTROL METHOD, AND COMPUTER-READABLE RECORDING MEDIUM RECORDED WITH INFORMATION DISTRIBUTION/REPRODUCTION CONTROL PROGRAM

(75) Inventors: Yu Minakuchi, Kanagawa (JP); Mitsuru Osawa, Kanagawa (JP); Yasuyuki Nakajima, Saitama (JP); Hiromasa Yanagihara, Saitama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/534,403

(22) Filed: Mar. 22, 2000

(30) Foreign Application Priority Data

Aug. 9, 1999 (JP) .................................. 11/225743

(51) Int. Cl.
*G06F 15/16* (2006.01)

(52) U.S. Cl. .................. 709/231; 709/203; 709/232

(58) Field of Classification Search .................. 709/231, 709/208, 232, 203
See application file for complete search history.

(56) References Cited

U.S. PATENT DOCUMENTS

| | | | | |
|---|---|---|---|---|
| 5,913,039 A | * | 6/1999 | Nakamura et al. | 709/231 |
| 5,928,331 A | * | 7/1999 | Bushmitch | |
| 5,938,734 A | * | 8/1999 | Yao et al. | 709/232 |
| 6,226,673 B1 | * | 5/2001 | Yoshimoto | 709/223 |
| 6,314,576 B1 | * | 11/2001 | Asamizuya | 725/91 |
| 6,320,588 B1 | * | 11/2001 | Palmer et al. | 345/473 |
| 6,438,596 B1 | * | 8/2002 | Ueno et al. | 709/226 |
| 6,580,870 B1 | * | 6/2003 | Kanazawa et al. | 386/95 |

FOREIGN PATENT DOCUMENTS

| | | |
|---|---|---|
| JP | 5-236297 A | 9/1993 |
| JP | 10-13811 A | 1/1998 |
| JP | 10-187320 A | 7/1998 |

* cited by examiner

*Primary Examiner*—Jason D Cardone
*Assistant Examiner*—Adnan M Mirza
(74) *Attorney, Agent, or Firm*—Staas & Halsey LLP

(57) ABSTRACT

In an information distribution/reproduction control apparatus, a plurality of stream servers distribute real-time reproducible stream information to a plurality of clients through a network like the Internet. A transit control server controls the stream servers for the distribution of the stream information, and also controls the clients for real-time reproduction of the stream information.

8 Claims, 25 Drawing Sheets

FIG.4A

J1; SERVER INFORMATION

| SERVER NAME | SERVER IP ADDRESS | CONTENTS NAME | MULTICAST ADDRESS |
|---|---|---|---|
| STREAM SERVER 1 | 11.2.3.100 | CONTENTS 1 | 239.0.10.100 |
| : | : | : | : |
| STREAM SERVER n | 11.2.3.199 | CONTENTS n | 239.0.10.199 |

FIG.4B

J2; CLIENT INFORMATION

| CLIENT NAME | CLIENT IP ADDRESS |
|---|---|
| CLIENT 1 | 22.33.44.100 |
| : | : |
| CLIENT m | 22.33.44.199 |

FIG.9

J3; DISTIBUTION SCHEDULE INFORMATION

| DATE | START TIME | END TIME | CONTENTS NAME 1 | CONTENTS NAME 2 | DISPLAY METHOD |
|---|---|---|---|---|---|
| 1999.07.30 | 12:00.00 | 12:30.00 | CONTENTS 1 | CONTENTS 2 | LATERAL PARALLEL DISPLAY |
| 1999.07.31 | 13:00.00 | 15:00.00 | CONTENTS 3 | CONTENTS 4 | LATERAL PARALLEL DISPLAY |
| .. | .. | .. | .. | .. | .. |

FIG.16

J4; CLIENT CONTROL SERVER

| SERVER NAME | SERVER IP ADDRESS | CONTENTS NAME | MULTICAST ADDRESS | IMAGE | DISPLAY SIZE | VOICE | REPRODUCTION SPEED |
|---|---|---|---|---|---|---|---|
| STREAM SERVER 1 | 11.2.3.100 | CONTENTS 1 | 239.0.10.100 | DISPLAY | 320×240 | REPRO-DUCTION | NORMAL SPEED |
| .. | .. | .. | .. | .. | .. | .. | .. |
| STREAM SERVER n | 11.2.3.199 | CONTENTS n | 239.0.10.199 | DISPLAY | 320×240 | NO VOICE | NORMAL SPEED |

| SOUND VOLUME | REPRODUCTION STATUS DISPLAY | TITLE | TITLE DISPLAY | REPRODUCTION TIME DISPLAY | DISPLAY OF THE LINK STATUS OF THE MOVING PICTURE FILE AND THE VOICE FILE |
|---|---|---|---|---|---|
| LARGE | DISLPAY | Ctt1 | DISLPAY | DISPLAY ON THE SCREEN | DISPLAY FILE NAMES OF BOTH |
| .. | .. | .. | .. | .. | .. |
| SMALL | NO DISPLAY | Ctt2 | NO DISPLAY | NO DISPLAY | NO DISPLAY |

FIG.18

J5;STREAM REPRODUCTION INFORMATION

| FIRST STREAM INFORMATION | | SECOND STREAM INFORMATION | | SUPERIMPOSITION OF IMAGES | VOICE REPRODUCTION METHOD |
|---|---|---|---|---|---|
| SEREVER NAME | CONTENTS NAME | SEREVER NAME | CONTENTS NAME | | |
| STREAM SERVER 1 | CONTENTS 1 | STREAM SERVER 2 | CONTENTS 2 | NO | SYNTHESIS |

FIG.20

J6; STREAM REPRODUCTION INFORMATION

| STREAM NUMBER | CONTENTS NAME | DISPLAY INFORMATION || VOICE REPRODUCTION INFORMATION ||
| --- | --- | --- | --- | --- | --- |
| | | DISPLAY SIZE | DISPLAY LAYOUT | SOUND VOLUME ALLOCATION | TIME ALLOCATION |
| 1 | CONTENTS 1 | 1:640×480 | WHOLE DISPLAY | 1:100% | 1:100% |
| 2 | CONTENTS 1 CONTENTS 2 | 1:320×240 2:320×240 | LATERAL AND PARALLEL DISPLAY | 1:100% 2: 0% | 1:100% 2: 0% |

FIG.22

J7; STREAM REPRODUCTION INFORMATION

| STREAM NUMBER | CONTENTS NAME | DISPLAY INFORMATION | | VOICE/SOUND QUALITY INFORMAITON |
|---|---|---|---|---|
| | | FRAME RATE PER STREAM | NUMBER OF COLORS | |
| 1 | CONTENTS 1 | 1:30fps | 16 MILLION | 1:44.1kHz,16bit |
| 2 | CONTENTS 1 | 1:15fps | 16 MILLION | 1:22.05kHz,8bit |
| | CONTENTS 2 | 2:15fps | 16 MILLION | 2: NO OUTPUT |

FIG.24

J8: STREAM REPRODUCTION INFORMATION

| FIRST STREAM INFORMATION | | | SECOND STREAM INFORMATION | | |
|---|---|---|---|---|---|
| SERVER NAME | CONTENTS NAME | IMPORTANCE LEVEL | SERVER NAME | CONTENTS NAME | IMPORTANCE LEVEL |
| STREAM SERVER 1 | CONTENTS 1 | HIGH | STREAM SERVER 2 | CONTENTS 2 | LOW |

| REPRODUCTION INFORMATION ON STREAM INFORMATION WITH HIGH IMPORTANCE LEVEL | | | | | | |
|---|---|---|---|---|---|---|
| DISPLAY POSITION | DISPLAY SIZE | FRAME RATE | NUMBER OF COLORS | VALUE | CHROMA | PRESENCE OR ABSENCE OF VOICE REPRODUCTION |
| UPPER ROW | 640×480 | 30fps | 16MILLION | HIGH | HIGH | WITH REPRODUCTION |

| REPRODUCTION INFORMATION ON STREAM INFORMATION WITH LOW IMPORTANCE LEVEL | | | | | | |
|---|---|---|---|---|---|---|
| DISPLAY POSITION | DISPLAY SIZE | FRAME RATE | NUMBER OF COLORS | VALUE | CHROMA | PRESENCE OR ABSENCE OF VOICE REPRODUCTION |
| LOWER ROW | 320×240 | 15fps | 65000 | LOW | LOW | WITHOUT REPRODUCTION |

INFORMATION DISTRIBUTION/REPRODUCTION CONTROL APPARATUS, INFORMATION DISTRIBUTION/REPRODUCTION CONTROL METHOD, AND COMPUTER-READABLE RECORDING MEDIUM RECORDED WITH INFORMATION DISTRIBUTION/REPRODUCTION CONTROL PROGRAM

FIELD OF THE INVENTION

The present invention relates to an information distribution/reproduction control apparatus, an information distribution/reproduction control method, and a computer-readable recording medium recorded with an information distribution/reproduction control program, to be used for controlling the distribution and reproduction of stream information (moving picture data and voice data) that can be reproduced in real time. This invention particularly relates to a technology of carrying out a proper distribution and a proper real-time reproduction of stream information and that can provide an information distribution service with high added value.

BACKGROUND OF THE INVENTION

Along with the popularization of the internet and intranet, there has recently been paid attention to an information distribution system for live broadcasting the status of a lecture or a concert in a similar manner to that of a prior-art television broadcasting. According to this system, stream information that a client can reproduce in real time is generated from image data and voice data based on a streaming technique, and this stream information is distributed to a plurality of clients at the same time through a network. Providers of such an information distribution service are not only carrying out a simple distribution of the stream information but also are groping for a provision of higher value-added services in line with the growing trend of multimedia.

Conventionally, under the environments of internet and intranet, there has so far been diffused an information distribution system for real-time distributing the status of a lecture, a concert or the like as stream information (moving picture data and voice data) to the service receivers. This information distribution system is structured by a video camera and a microphone installed respectively at the place of a lecture or a concert, and a stream server for generating stream information (contents information) that can be reproduced by moving picture data and voice data from the video camera and microphone in real time by using a streaming technique and for distributing this stream information to a plurality of clients through an internet or the like.

Each of the plurality of clients receives the stream information and reproduces this stream information in real time. Recently, this information distribution system has come to attract considerable attention as the system can distribute stream information so long as there are clients connected to the internet or the like.

As explained above, in the prior-art information distribution system, the client can reproduce a plurality of kinds of stream information at the same time. However, there is no external control applied to this reproduction. Therefore, this system has a drawback in that when more than necessary stream information has been reproduced in real time, the contents information that is most necessary is easily missed. In the worst case, there is considered a situation where the volume of stream information received is beyond the processing capacity at the client side so that it is not possible to reproduce any information.

Further, there is no external control applied to the stream server side either. Therefore, the stream server can distribute as much volume of a plurality of stream information as possible. In this case, there is considered a case where the traffic volume of the internet and others exceeds a prescribed value and a congestion occurs so that the channel utilization efficiency is lowered extremely.

Further, the prior-art information distribution system is a broadcasting type system which is specialized in the distribution of stream information that can be reproduced in real time. Therefore, this system makes no difference from the existing television broadcasting system in that the contents information is reproduced in real time.

Thus, when the prior-art information distribution system is compared with the existing television broadcasting system in the aspect of cost, the information distribution system requires a higher connection charge to be paid to the telecommunications service enterprises for the utilization of a network. On the other hand, the television broadcasting system requires a substantially lower cost of connection charge. Accordingly, when only the cost aspect is compared, it can be said that the prior-art information distribution system cannot compete at all with the existing television broadcasting system.

Under the above circumstances, providers of the information distribution service using the information distribution system have not limited their services to a simple distribution of the stream information but have been groping for a provision of higher value-added services. However, at present, the providers have not yet found decisive services that can compete with the services of the existing television broadcasting system.

SUMMARY OF THE INVENTION

It is an object of the present invention to provide an information distribution/reproduction control apparatus, an information distribution/reproduction control method, and a computer-readable recording medium recorded with an information distribution/reproduction control program that can carry out a proper distribution and a proper real-time reproduction of stream information and that can also provide an information distribution service with high added value.

In order to achieve the above object, the information distribution/reproduction control apparatus according to one aspect of the present invention comprises a distribution control unit for carrying out a control relating to a distribution of stream information that can be reproduced in real time, to an information distribution device for distributing the stream information to a receiving device; and a reproduction control unit for carrying out a control relating to a real-time reproduction of the stream information, to the receiving device.

According to the above invention, the distribution control unit controls the distribution of the stream information by taking into consideration the traffic volume of a network and the processing capacity of the receiving device, for example. Thus, the stream information is distributed from the information distribution device to the receiving device in a status that the traffic volume and others are taken into consideration. Further, when the reproduction control unit has carried out the control relating to the real-time reproduction of the stream information by taking into consideration the processing capacity of the receiving device, for example, the receiving device properly receives the stream information and then carries out the real-time reproduction of this stream information.

Thus, the distribution control unit carries out the distribution control and the reproduction control unit carries out the reproduction control. Therefore, it is possible to carry out the proper distribution and the proper real-time reproduction of the stream information. It is also possible to provide the information distribution service with high added value.

Further, a change-over unit to be manipulated by an operator is provided, for changing over the control of the reproduction control unit to other control. The reproduction control unit controls the receiving device according to a change-over status of the change-over unit.

According to the above invention, when the control has been changed over to other control by the change-over unit, the reproduction control unit changes over the control of the receiving device to the other control. Thus, the change-over unit facilitates the change-over of the control. As a result, it is possible to improve the use of the apparatus.

Further, a memory unit is provided for storing schedule information on a control schedule of the distribution control unit and a control schedule of the reproduction control unit. The distribution control unit controls the information distribution device based on the schedule information, and the reproduction control unit controls the receiving device based on the schedule information.

According to the above invention, the distribution control unit and the reproduction control unit carry out the predetermined schedule controls respectively based on the schedule information. Thus, the distribution control and the control of the real-time reproduction are carried out based on the schedule information. Therefore, it is possible to flexibly cope with a change in the control method, by only changing the schedule information.

Further, a plurality of receiving devices are provided. The reproduction control unit carries out an identical control to the plurality of receiving devices and prohibits an execution of an external control relating to a reproduction at the plurality of receiving devices.

According to the above the invention, when the reproduction control unit has carried out the same control, the plurality of receiving devices carry out a real-time reproduction in the same reproduction quality. In this case, an external control relating to the reproduction is prohibited. Thus, the same control is carried out to the receiving devices and an external control relating to the reproduction is prohibited. Therefore, it is possible to carry out a real-time reproduction in a status that a constant reproduction quality is maintained.

Further, a plurality of receiving devices are provided. The reproduction control-unit carries out an identical control to the plurality of receiving devices and permits an execution of an external control relating to a reproduction at the plurality of receiving devices.

According to the above invention, when the reproduction control unit has carried out the same control, the plurality of receiving devices carry out a real-time reproduction in the same reproduction quality. In this case, an external control relating to the reproduction is permitted. Accordingly, it is also possible to carry out a real-time reproduction based on an external control. Thus, an external control relating to the reproduction in the receiving devices is permitted. Therefore, it is possible to flexibly carry out a real-time reproduction control.

The information distribution/reproduction control apparatus according to another aspect of the present invention comprises a distribution control unit for controlling an information distribution device to distribute real-time reproducible stream information to the distribution control unit itself; an editing unit for distributing edit stream information that is the stream information edited, to a receiving device; and a reproduction control unit for carrying out a control relating to a real-time reproduction of the edit stream information to the receiving device.

According to the above invention, when the distribution control unit has carried out a distribution control, the information distribution device distributes the stream information to the distribution control unit. With this arrangement, the edit control unit carries out an editing in such a way as to compress a plurality of stream information into one stream information, for example. Then, the edit control unit controls to distribute a result of this editing to the receiving device as edit stream information. Based on the control of the reproduction control unit, the receiving device carries out a real-time reproduction of the edit stream information.

Thus, the edit control unit controls to distribute the edited stream information to the receiving device. Therefore, as compared with the case of distributing the stream information to the receiving device, it is possible to decrease the traffic volume of the transmission paths of the network or the like.

The information distribution/reproduction control apparatus according to still another aspect of the present invention comprises a distribution control unit for controlling an information distribution device to distribute edit stream information that is real-time reproducible stream information to a receiving device; and a reproduction control unit for carrying out a control relating to a real-time reproduction of the edit stream information to the receiving device.

According to the above invention, when the distribution control unit has carried out a distribution control, the information distribution device carries out an editing in such a way as to compress a plurality of stream information into one stream information, for example. Then, the information distribution device distributes a result of this editing to the receiving device as edit stream information. Based on the control of the reproduction control unit, the receiving device carries out a real-time reproduction of the edit stream information.

Thus, the edit control unit controls to distribute the edited stream information to the receiving device. Therefore, as compared with the case of distributing the stream information to the receiving device, it is possible to decrease the traffic volume of the transmission paths of the network or the like.

The information distribution/reproduction control apparatus according to still another aspect of the present invention comprises a distribution control unit for carrying out a control relating to a distribution of stream information including moving picture data that can be reproduced in real time, to a plurality of information distribution devices for distributing the stream information to a receiving device; and a reproduction control unit for controlling a display method relating to a real-time reproduction of a plurality of the stream information to the receiving device.

According to the above invention, the distribution control unit controls the distribution of the stream information including the moving picture data by taking into consideration the traffic volume of a network and the processing capacity of the receiving device, for example. Thus, the stream information including the moving picture data is distributed from the information distribution device to the receiving device in a status that the traffic volume and others are taken into consideration. Further, when the reproduction control unit has controlled the method of displaying the moving picture relating to the real-time reproduction of the stream information by taking into consideration the processing capacity of the receiving device, for example, the receiving device receives the stream information and then displays the moving picture according to the display method.

Thus, the distribution control unit carries out the distribution control and the reproduction control unit carries out the control of the method of displaying the moving picture. Therefore, it is possible to carry out the real-time reproduction of the stream information based on the proper distribution of the stream information and the proper display method. Further, it is also possible to provide the information distribution service with high added value.

The information distribution/reproduction control apparatus according to still another aspect of the present invention comprises a distribution control unit for carrying out a control relating to a distribution of stream information including moving picture data and voice data that can be reproduced in real time, to a plurality of information distribution devices for distributing the stream information to a receiving device; and a reproduction control unit for controlling a method of displaying the moving picture and a method of outputting the voice, relating to a real-time reproduction of a plurality of the stream information to the receiving device.

According to the above invention, the distribution control unit controls the distribution of the stream information including the moving picture data and the voice data by taking into consideration the traffic volume of a network and the processing capacity of the receiving device, for example. Thus, the stream information including the moving picture data and the voice data is distributed from the information distribution device to the receiving device in a status that the traffic volume and others are taken into consideration. Further, when the reproduction control unit has controlled the display method and the voice output method relating to the real-time reproduction of the stream information by taking into consideration the processing capacity of the receiving device, for example, the receiving device receives the stream information and then displays the moving picture according to the display method and outputs the voice according to the output method.

Thus, the distribution control unit controls the distribution and the reproduction control unit controls the method of displaying the moving picture and the method of outputting the voice. Therefore, it is possible to carry out the real-time reproduction of the stream information based on the proper distribution, proper display method and proper output method of the stream information. Further, it is also possible to provide the information distribution service with high added value.

Further, a memory unit is provided for storing importance level information on the importance level of each of the plurality of stream information. The reproduction control unit controls the receiving device so as to reproduce the stream information of higher level of importance with higher priority over the rest of the stream information based on the importance level information.

According to the above invention, the distribution control unit controls the distribution of the stream information by taking into consideration the traffic volume of a network and the processing capacity of the receiving device, for example. Thus, the stream information is distributed from the information distribution device to the receiving device in a status that the traffic volume and others are taken into consideration. Further, when the reproduction control unit has carried out the control relating to the real-time reproduction of the stream information based on the processing capacity of the receiving device and the importance level information, for example, the receiving device reproduces the stream information of higher level of importance with higher priority over the rest of the stream information.

Thus, the stream information of higher level of importance is reproduced in real time with higher priority. Therefore, it is possible to prevent this important stream information from being missed.

The information distribution/reproduction control method according to still another aspect of the present invention comprises the steps of carrying out a control relating to a distribution of stream information that can be reproduced in real time, to an information distribution device for distributing the stream information to a receiving device; and carrying out a control relating to a real-time reproduction of the stream information, to the receiving device.

According to the above invention, in the distribution control process, the distribution of the stream information is controlled by taking into consideration the traffic volume of a network and the processing capacity of the receiving device, for example. Thus, the stream information is distributed from the information distribution device to the receiving device in a status that the traffic volume and others are taken into consideration. Further, when the control relating to the real-time reproduction of the stream information has been carried out in the reproduction control process, by taking into consideration the processing capacity of the receiving device, for example, the receiving device properly receives the stream information and then carries out the real-time reproduction of this stream information.

Thus, the distribution control is carried out in the distribution control process and the reproduction control is carried out in the reproduction control process. Therefore, it is possible to carry out the proper distribution and the proper real-time reproduction of the stream information. It is also possible to provide the information distribution service with high added value.

The recording medium according to still another aspect of the present invention records a program that makes a computer execute the steps of the information distribution/reproduction control method described above. Thus, the information distribution/reproduction control method can easily be realized on a computer.

The recording medium according to still another aspect of the present invention records a program that makes a computer execute the steps of making an information distribution device carry out a control so as to distribute real-time reproducible stream information; making edit stream information, that is the edited stream information, to be distributed to a receiving device; and making the receiving device carry out a control relating to a real-time reproduction of the edit stream information.

According to the above the invention, the steps can easily be executed on a computer.

Other objects and features of this invention will become apparent from the following description with reference to the accompanying drawings.

BRIEF DESCRIPTION OF THE DRAWINGS

FIG. 4A shows server information $J_1$ and FIG. 4B shows client information $J_2$ to be used in the first to thirteenth embodiments.

FIG. 9 shows a distribution schedule information $J_3$ to be used in the third embodiment according to the present invention.

FIG. 16 shows a client control information $J_4$ to be used in the ninth embodiment according to the present invention.

FIG. 18 shows a stream reproduction information $J_5$ to be used in the tenth to twelfth embodiments according to the present invention.

FIG. 20 shows a stream reproduction information $J_6$ to be used in the eleventh embodiment according to the present invention.

FIG. 22 shows a stream reproduction information $J_7$ to be used in the twelfth embodiment according to the present invention.

FIG. 24 shows a stream reproduction information $J_8$ to be used in the thirteenth embodiment according to the present invention.

DESCRIPTION OF THE PREFERRED EMBODIMENTS

There will now be explained in detail below, with reference to the drawings, first to thirteenth embodiments of the present invention relating to an information distribution/reproduction control apparatus, an information distribution/reproduction control method, and a computer-readable recording medium recorded with an information distribution/reproduction control program.

Figure 1:
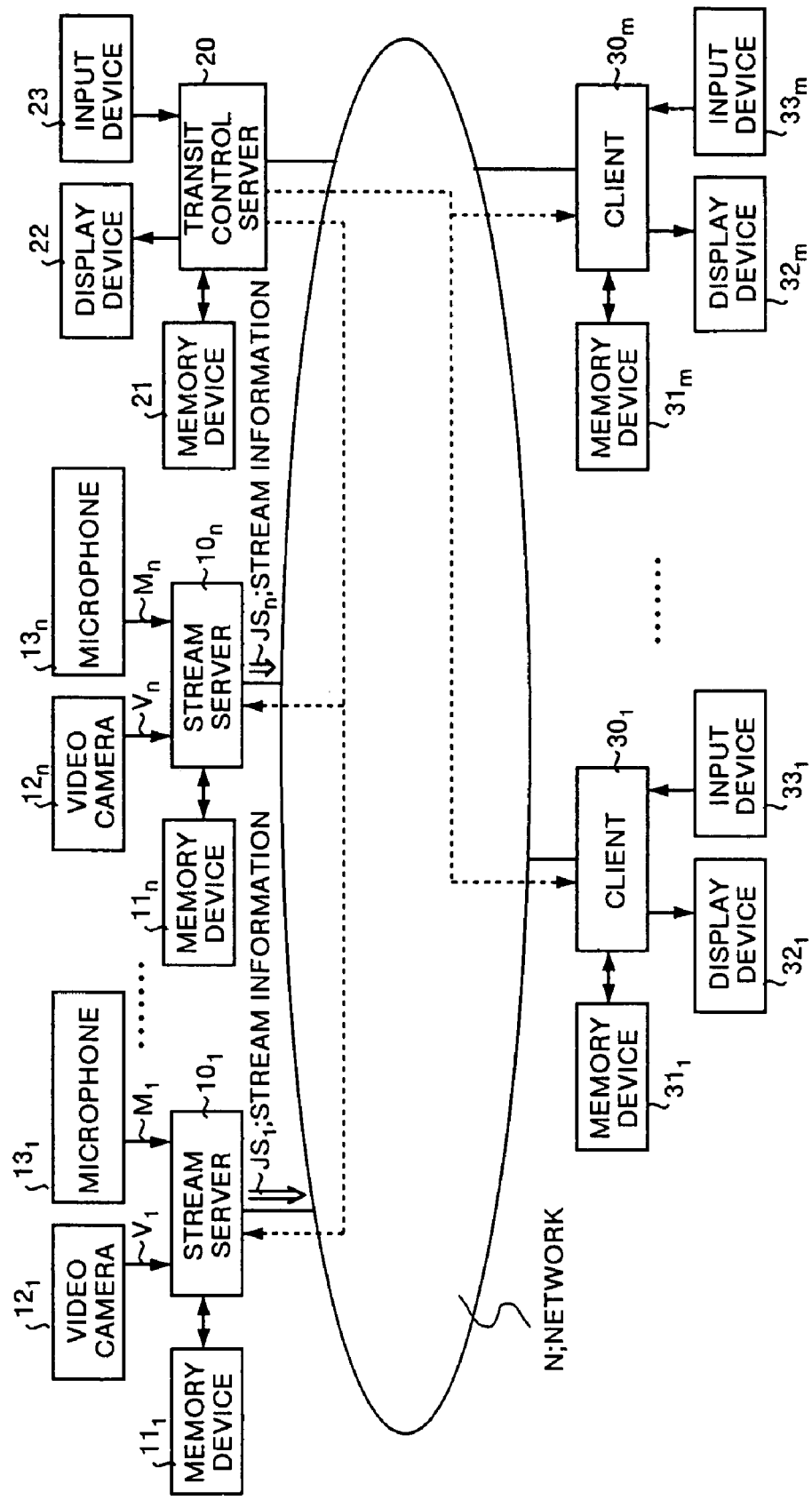
FIG. 1 a block diagram showing a configuration of first to thirteenth embodiments according to the present invention.

FIG. 1 is a block diagram showing a first embodiment of the present invention. An information distribution system shown in FIG. 1 is a system for real-time distributing stream information (moving picture data and voice data) to a plurality of clients by using a streaming technique and for making the stream information reproduced in real time at the side of the plurality of clients.

In the following, a description will be made based on a case of employing a multicast system as a communication system as an example. The multicast system is a communication system for transmitting information to a plurality of specific clients at the same time, and this system is called a specific group simultaneous multi-address communication system. Further, the information distribution system is utilized for live broadcasting such as lectures and concerts as the information can be reproduced in real time.

A network N shown in FIG. 1 is a LAN (Local Area Network), an intranet, an internet or the like, for transmitting stream information $JS_1$ to $JS_n$ and others to be described later. To this network N, there are connected stream servers $10_1$ to $10_n$ and a transit control server 20 installed at a distributor side and clients $30_1$ to $30_m$ ($m \geq n$) installed at a side of users (receivers side) respectively.

The stream servers $10_1$ to $10_1$ generate the stream information $JS_1$ to $JS_n$ respectively, and distribute these stream information $JS_1$ to $JS_n$ to the clients $30_1$ to $30_m$ based on the control of the transit control server 20. In this case, the stream information $JS_1$ to $JS_n$ are the information of compressed contents made up of moving picture data and voice data, using a stream band, a frame rate, a screen size, etc. as parameters. The stream band is an occupied transmission band used for transmitting the stream information $JS_1$ to $JS_n$ to the network N. The frame rate is a number of frames per each second of the stream information that is reproduced in real time by the clients $30_1$ to $30_m$. As the frame rate is larger, it is possible to reproduce a smoother moving picture, which however requires a larger stream band. The screen size is a number of pixels (number of vertical pixels×number of lateral pixels) that structure the stream information reproduced in real time at the users side.

Memory devices $11_1$ to $11_n$ are hard disk devices, for example, and they are used as main memories of the stream servers $10_1$ to $10_n$ respectively. Video cameras $12_1$ to $12_n$ are installed at the places of lectures and concerts respectively, and they pick up images of the statuses of the lectures and concerts in real time. The video cameras $12_1$ to $12_n$ then output image picked-up results as moving picture data $V_1$ to $V_n$ to the stream servers $10_1$ to $10_n$ respectively. Similarly, microphones $13_1$ to $13_n$ are also installed at the places of lectures and concerts respectively. The microphones $13_1$ to $13_n$ convert voices of lecturers and voices at the place of the concert into voice data $M_1$ to $M_n$ respectively, and output the voice data $M_1$ to $M_n$ to the stream servers $10_1$ to $10_n$ in real time.

Figure 2:
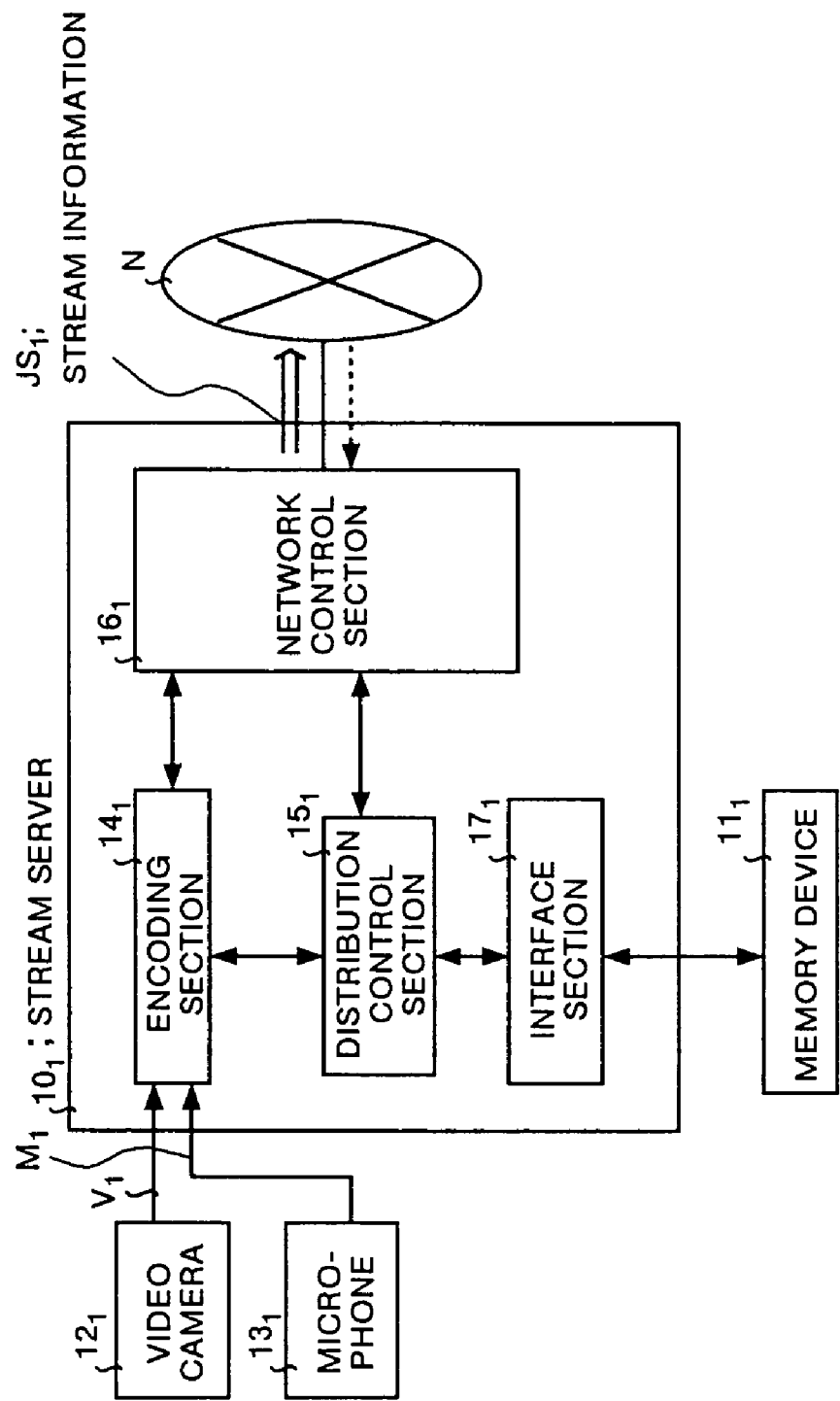
FIG. 2 is a block diagram showing a configuration of a stream server $101_1$ shown in FIG. 1.

The structure of the stream server $10_1$ will be explained in detail with reference to FIG. 2. In FIG. 2, portions corresponding to the same portions in FIG. 1 are attached with the same reference symbols. In the stream server $10_1$ shown in FIG. 2, an encoding section $14_1$ encodes the moving picture data $V_1$ and the voice data $M_1$ captured by the video camera $12_1$ and the microphone $13_1$ based on the parameters such as the stream band, the frame rate, the screen size, etc., and generates the stream information $JS_1$.

Specifically, the encoding section $14_1$ converts the moving picture data $V_1$ and the voice data $M_1$ into digital data respectively and then decreases the information volume of the digital data by taking the screen size, the frame rate, etc. into consideration. Further, the encoding section $14_1$ compresses the digital data in real time by using a code technique, and generates the stream information $JS_1$ in which the moving picture data $V_1$ and the voice data $M_1$ are synchronized.

A distribution control section $15_1$ carries out a distribution control of the stream information $JS_1$ (contents), a distribution posting for informing the clients $30_1$ to $30_m$ of a fact that there is a distribution of contents to them, etc. A detailed description of the operation of the distribution control section $15_1$ will be made later. A network control section $16_1$ has a function of sending the stream information $JS_1$ to the network N at the transfer rate corresponding to the transmission band of the network N, by using a distribution protocol. Further, the network control section $16_1$ also has a buffering function for storing the stream information $JS_1$ when there has been generated a transmission loss during a transmission of the stream information $JS_1$ due to the congestion of the network N. An interface section $17_1$ takes an interface between the distribution control section $15_1$ and the memory device $11_1$. The other stream servers $10_2$ to $10_n$ (not shown) also have similar structures to that of the stream server $10_1$.

Referring back to FIG. 1, the transit control server 20 controls the distribution of the stream information $JS_1$ to $JS_n$ in the stream servers $10_1$ to $10_n$, based on the server information $J_1$ and the client information $J_2$ shown in FIG. 4A and FIG. 4B, and also controls the reception/reproduction of the stream information $JS_1$ to $JS_n$ in the clients $30_1$ to $30_m$. A detailed description of the transit control server 20 will be made later.

The server information $J_1$ shown in FIG. 4A is the information on the stream servers $10_1$ to $10_1$, and is composed of "server name", "server IP (Internet Protocol) address", "contents name" and "multicast address". The "server name" is a name of each of the stream servers $10_1$ to $10_n$. In an example shown in this drawing, the "stream server 1" is the name of the stream server $10_1$, and, similarly, the "stream server n" is the name of the stream server $10_n$.

The "server IP address" is an IP address of each of the stream servers $10_1$ to $10_n$. In the example shown in this drawing, the "server IP address" of the stream server $10_1$ is "11.2.3.100". Similarly, the "server IP address" of the stream server $10_n$ is "11.2.3.199". The "contents name" is a name of contents provided by each of the stream information $JS_1$ to $JS_n$. In the example shown in this drawing, the "contents name" relating to the stream information $JS_1$ is "contents 1". Similarly, the "contents name" relating to the stream information $JS_n$ is "contents n".

The "multicast address" is an address allocated to a multicast group (a specific group) existing on the network N. This address is used as a distribution destination IP address for distributing the stream information $JS_1$ to $JS_n$ to the multicast group.

Specifically, the "multicast address" of the stream server $10_1$ is "239.0.10.100". For example, this is an address allocated to a multicast group structured by the clients $30_1$ to $30_m$. Accordingly, when the stream information $JS_1$ has been distributed to the multicast address called "239.0.10.100", the stream information $JS_1$ is distributed to the clients $30_1$ to $30_m$ (multicast group).

Similarly, the "multicast address" of the stream server $10_n$ is "239.0.10.199". For example, this is an address allocated to a multicast group structured by the clients $30_1$ to $30_m$. Accordingly, when the stream information $JS_n$ has been distributed to the multicast address called "239.0.10.199", the stream information $JS_n$ is distributed to the clients $30_1$ to $30_m$ (multicast group).

Further, the client information $J_2$ shown in FIG. 4B is the information ("client name" and "client IP address") on the clients $30_1$ to $30_m$. The "client name" is a name of each of the clients $30_1$ to $30_m$. In the case of an example shown in this drawing, the "client name" for each client is "client 1" to the "client m". The "client IP address" is an IP address given to each of the clients $30_1$ to $30_m$. In the case of the example shown in this drawing, the "client IP address" is "22.33.44.100" to "22.33.44.199".

Referring back to FIG. 1, the memory device 21 stores the server information $J_1$ and the client information $J_2$. The display device 22 is structured by a display section such as a CRT (Cathode-Ray Tube) or an LCD (Liquid Crystal Display), and a voice output section such as a pre-amplifier or a speaker. The input device 23 is an input device such as a mouse and a keyboard.

Figure 3:
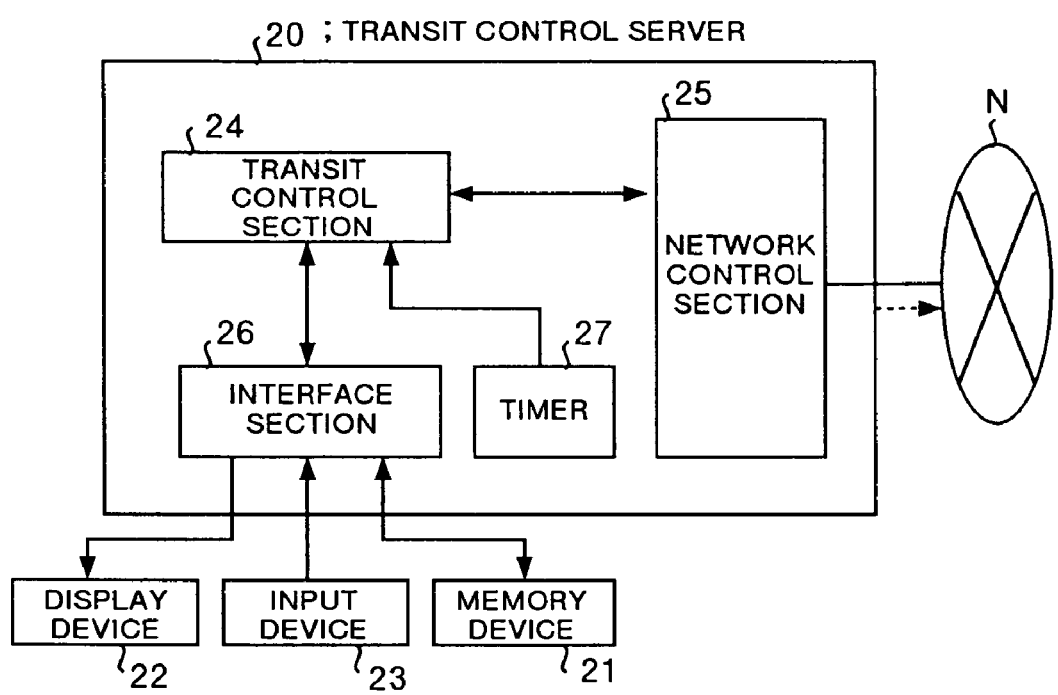
FIG. 3 is a block diagram showing a transit control server 20 shown in FIG. 1.

The structure of the transit control server 20 described above will be explained below with reference to FIG. 3. In FIG. 3, portions corresponding to portions in FIG. 1 are attached with the same reference symbols. A transit control section 24 shown in this drawing carries out a distribution control and a reception/reproduction control of the stream information $JS_1$ to $JS_n$ based on the server information $J_1$ and the client information $J_2$ (see FIG. 4A and FIG. 4B). A detailed description of the operation of the transit control section 24 will be made later.

A network control section 25 carries out a communication control between the stream servers $10_1$ to $10_n$ and the clients $30_1$ to $30_m$, according to TCP/IP (Transmission Control Protocol/Internet Protocol), for example. A timer 27 outputs a result of a time measurement to the transit control section 24. An interface section 26 takes an interface between the transit control section 24, the memory device 21, the display device 22 and the input device 23.

Referring back to FIG. 1, the clients $30_1$ to $30_m$ receive designated stream information out of the stream information $JS_1$ to $JS_n$ distributed from the stream servers $10_1$ to $10_n$ through the network N, based on the reception/reproduction control of the transit control server 20. Then, the clients $30_1$ to $30_m$ reproduce the stream information in real time. Each of display devices $32_1$ to $32_m$ is structured by a display section such as a CRT or an LCD, and a voice output section such as a preamplifier or a speaker.

The display section displays a moving picture when the stream information has been reproduced in real time. On the other hand, the voice output section outputs voice when the stream information has been reproduced in real time. Input devices $33_1$ to $33_m$ are input devices such as a mouse and a keyboard. Memory devices $31_1$ to $31_m$ are hard disks, for example, and they play the role of main memories for the clients $30_1$ to $30_m$ respectively.

Figure 5:
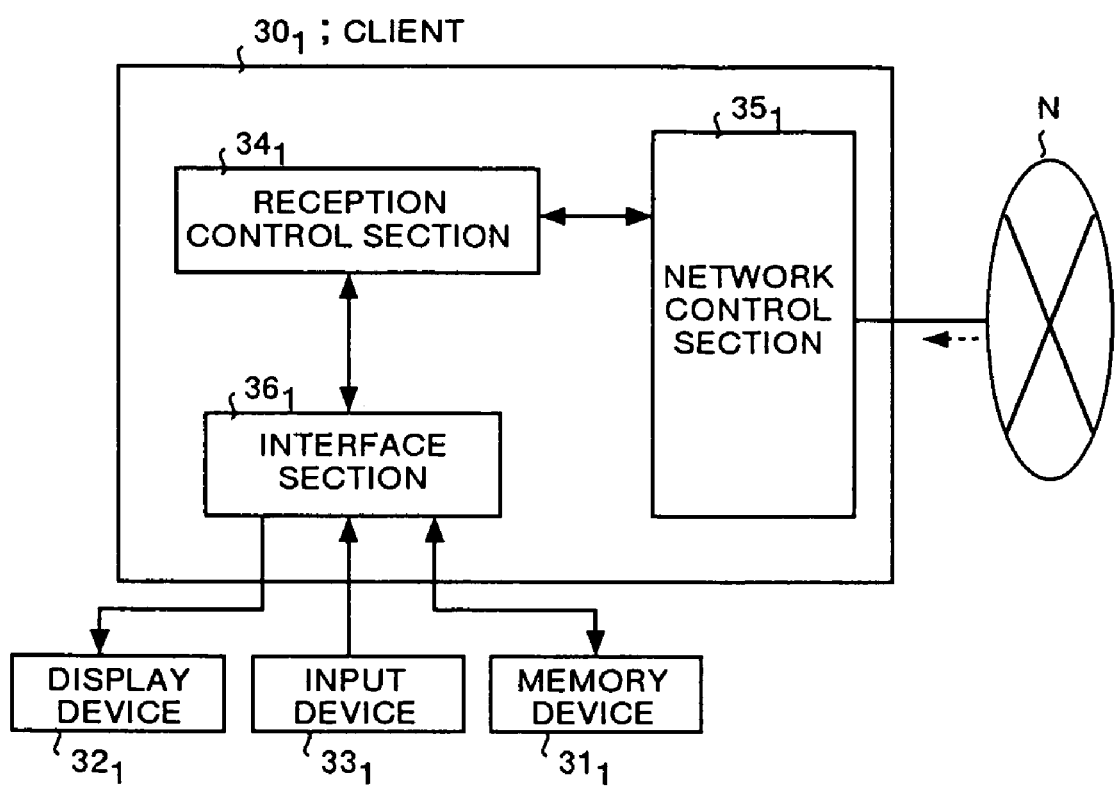
FIG. 5 is a block diagram showing a configuration of a client $30_1$ shown in FIG. 1.

The structure of the client $30_1$ described above will be explained in detail with reference to FIG. 5. In FIG. 5, portions corresponding to portions in FIG. 1 are attached with the same reference symbols. A reception control section $34_1$ shown in this drawing carries out a reception control and a reproduction control of distributed stream information. A detailed description of the reception control section $34_1$ will be made later. A network control section $35_1$ controls the communications between the stream servers $10_1$ to $10_n$ according to a distribution protocol.

Further, the network control section $35_1$ carries out a communication control between the transit control server 20 and the client $30_1$ according to the TCP/IP. An interface section $36_1$ takes an interface between the reception control section $34_1$, the display device $32_1$, the input device $33_1$ and the memory device $31_1$. Other clients $30_2$ to $30_m$ (not shown) also take the same structures as the structure of the client $30_1$.

Next, the operation of the first embodiment will be explained with reference to a flowchart shown in FIG. 6. When the operations of the stream servers $10_1$ to $10_n$ and the clients $30_1$ to $30_m$ in FIG. 1 have been started respectively, these stream servers and clients proceed to a step SA1 and a step SC1 shown in FIG. 6 respectively. At the step SA1, the distribution control sections (the distribution control section $15_1$: reference to FIG. 2) of the respective stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated.

Similarly, at the step SC1, the reception control sections (the reception control section $34_1$: reference to FIG. 5) of the respective clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input by the distributor by using the input device 23 shown in FIG. 3, the transit control section 24 of the transit control server 20 proceeds to a step SB1. At the step SB1, the transit control section 24 at first reads the server information $J_1$ shown in FIG. 4A from the memory device 21. Then, the transit control section 24 recognizes the "stream servers" (stream servers $10_1$ to $10_n$) that are the respective origins of the distribution of the stream information $JS_1$ to $JS_n$ from the server information $J_1$.

Further, the transit control section 24 recognizes the multicast addresses "239.0.10.100" to "239.0.10.199" of the distribution destinations of the stream information $JS_1$ to $JS_n$ respectively, from the server information $J_1$. Next, the transit control section 24 instructs the stream servers $10_1$ to $10_n$ corresponding to the respective stream information $JS_1$ to $JS_n$ to distribute these information, by taking into consideration the traffic volume of the network N and the processing capacity of the clients $30_1$ to $30_m$. Then, the transit control section 24 proceeds to the next step SB2.

Thus, the distribution control sections of the respective stream servers $10_1$ to $10_n$ shown in FIG. 1 make a decision as "Yes" at the step SA1, and then proceed to the next step SA2. At the step SA2, the distribution control sections of the respective stream servers $10_1$ to $10_n$ start the distribution of the stream information $JS_1$ to $JS_n$.

In other words, the moving picture data $V_1$ and the voice data $M_1$ relating to the "contents 1" are output from the video camera $12_1$ and the microphone $13_1$ shown in FIG. 2 respectively. When these moving picture data $V_1$ and voice data $M_1$ have been captured by an encoding section $14_1$, the encoding section $14_1$ encodes and compresses the moving picture data $V_1$ and voice data $M_1$ based on the parameters such as the stream band and others, thereby to generate the stream information $JS_1$. Similarly, stream servers $10_2$ to $10_n$ (not shown) generate stream information $JS_2$ to $JS_n$ (not shown) respectively in a similar manner to that of the stream server $10_1$.

Then, the distribution control sections of the respective stream servers $10_1$ to $10_n$ transmit the stream information $JS_1$ to $JS_n$ to the multicast address based on the server information $J_1$, and proceed to a step SA3. Thus, the stream information $JS_1$ to $JS_n$ are distributed respectively to the clients $30_1$ to $30_m$. At the step SA3, the distribution control sections of the respective stream servers $10_1$ to $10_n$ make a decision as to whether or not there is an instruction to end the distribution from the transit control server 20. In this case, a decision is made as "No", and the same process of decision making is repeated.

On the other hand, at the step SB2, the transit control section 24 of the transit control server 20 shown in FIG. 3 reads the client information $J_2$ (see FIG. 4B) from the memory device 21. Next, the transit control section 24 dispatches a reception/reproduction instruction to the client IP addresses "22.33.44.100" to "22.33.44.199" obtained from this client information $J_2$, that is, to the clients $30_1$ to $30_m$, and then proceeds to a step SB3. In this case, the transit control section 24 dispatches the reception/reproduction instruction by taking into consideration the processing capacity of the clients $30_1$ to $30_m$.

The reception/reproduction instruction in this case is the instruction to receive, the stream information $JS_1$ and $JS_2$, for example, from out of the stream information $JS_1$ to $JS_n$ transmitted to the multicast address based on the server information $J_1$, and to reproduce in real time the received stream information $JS_1$ and $JS_2$. At the step SB3, the transit control section 24 makes a decision as to whether or not there is an instruction from the distributor to end the distribution by using the input device 23. In this case, a decision is made as "No", and the same process of decision making is repeated.

Upon receiving the reception/reproduction instruction, the respective reception control sections (the reception control section $34_1$: reference to FIG. 5) of the clients $30_1$ to $30_m$ shown in FIG. 5 make a decision as "Yes" at the step SC1, and then proceed to a step SC2. At the step SC2, the respective reception control sections of the clients $30_1$ to $30_m$ start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, and then proceed to a step SC3. Specifically, the respective reception control sections of the clients $30_1$ to $30_m$ restore the stream information $JS_1$ and $JS_2$, thereby to generate the moving picture data and the voice data, and then supply these moving picture data and voice data to the respective display devices (the display device $32_1$: reference to FIG. 5). In this case, the moving picture data is converted into bit map data for each frame. Thus, the respective display devices of the clients $30_1$ to $30_m$ reproduce in real time the moving picture and voice relating to the "contents 1" and the "contents 2".

At the step SC3, the respective reception control sections of the clients $30_1$ to $30_m$ make a decision as to whether or not there is an instruction to end reception/reproduction from the transit control server 20. In this case, a decision is made as "No", and the same process of decision making is repeated. During this period, the stream information $JS_1$ and $JS_2$ are being reproduced in real time.

When the distributor has dispatched an instruction to end the reception/reproduction by using the input device 23, the transit control section 24 of the transit control server 20 shown in FIG. 3 makes a decision as "Yes" at the step SB3, and then proceeds to a step SB4. At the step SB4, the transit control section 24 dispatches an instruction to end the reception/reproduction to the clients $30_1$ to $30_m$ respectively, and then proceeds to a step SB5.

Upon receiving the instruction to end the reception/reproduction, the respective reception control sections of the clients $30_1$ to $30_m$ make a decision as "Yes" at the step SC3, and then proceed to a step SC4. At the step SC4, the respective reception control sections of the clients $30_1$ to $30_m$ end the reception and real-time reproduction of the stream information $JS_1$ and $JS_2$.

At the step SB5, the transit control section 24 instructs the stream servers $10_1$ to $10_n$ to end the distribution. Thus, the respective distribution control sections of the stream servers $10_1$ to $10_n$ make a decision as "Yes" at the step SA3, and then proceed to a step SA4. At the step SA4, the respective distribution control sections of the stream servers $10_1$ to $10_n$ end the distribution of the stream information $JS_1$ to $JS_n$.

As explained above, according to the first embodiment of the invention, the transit control section 24 carries out the distribution control and the reproduction control. Therefore, it is possible to carry out a proper distribution and a proper real-time reproduction of the stream information. It is also possible to provide the information distribution service with high added value.

In the first embodiment, there has been explained the case where the stream information designated by the transit control server 20 from among the stream information $JS_1$ to $JS_n$ is reproduced in real time by the clients $30_1$ to $30_m$, by the control of the transit control server 20. However, it is also possible to change the stream information to be received/reproduced during a real-time reproduction. This case will be explained below as a second embodiment. The hardware configuration of the second embodiment is the same as the hardware configuration of the first embodiment described above. However, in the case of the second embodiment, the function of the transit control server 20 shown in FIG. 1 is different from that of the first embodiment as described later.

Figure 7:
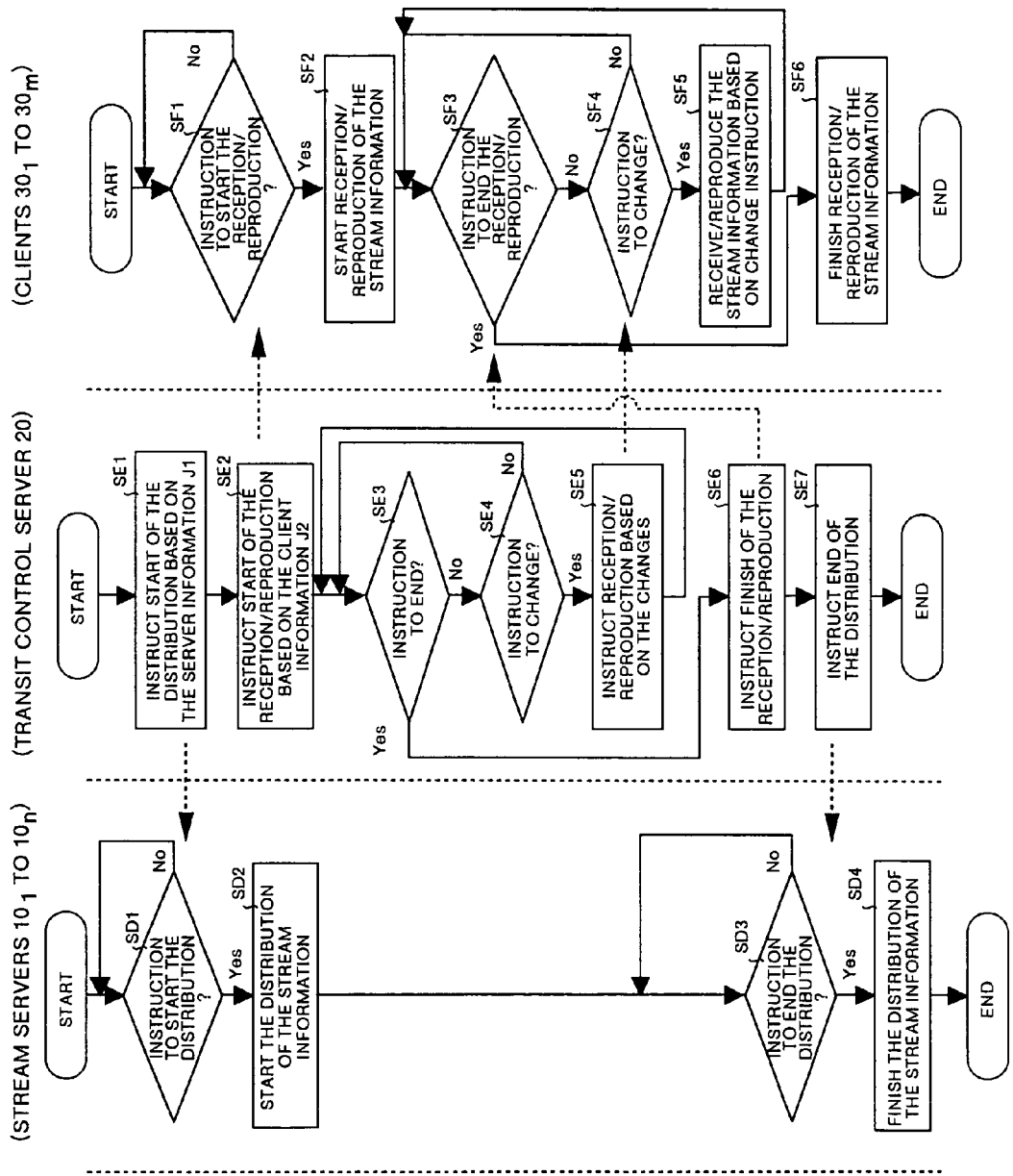
FIG. 7 is a flowchart explaining the operation of a second embodiment according to the present invention.

Next, the operation of the second embodiment will be explained with reference to a flowchart shown in FIG. 7. When the operations of the stream servers $10_1$ to $10_1$ and the clients $30_1$ to $30_m$ in FIG. 1 have been started respectively, these stream servers and clients proceed to a step SD1 and a step SF1 shown in FIG. 7 respectively. At the step SD1, the distribution control sections (the distribution control section $15_1$: reference to FIG. 2) of the respective stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated.

Similarly, at the step SF1, the reception control sections (the reception control section $34_1$: reference to FIG. 5) of the respective clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input by the distributor by using the input device 23 shown in FIG. 3, the transit control section 24 of the transit control server 20 proceeds to a step SE1. At the step SE1, similar to the operation at the step SB1 (see FIG. 6), the transit control section 24 instructs the stream servers $10_1$ to $10_n$ corresponding to the respective stream information $JS_1$ to $JS_n$ to distribute these information, based on the server information $J_1$ (see FIG. 4A) read from the memory device 21, and then proceeds to a step SE2. In this case, the transit control section 24 instructs the distribution of the stream information, by taking into consideration the traffic volume of the network N and the processing capacity of the clients $30_1$ to $30_m$.

Thus, the distribution control sections of the respective stream servers $10_1$ to $10_n$ shown in FIG. 2 make a decision as "Yes" at the step SD1, and then proceed to the next step SD2. At the step SD2, the distribution control sections of the respective stream servers $10_1$ to $10_n$ start the distribution of the stream information $JS_1$ to $JS_n$, and then proceed to a step SD3. At the step SD3, the distribution control sections of the respective stream servers $10_1$ to $10_n$ make a decision as to whether or not there is an instruction to end the distribution from the transit control server 20. In this case, a decision is made as "No", and the same process of decision making is repeated.

Figure 6:
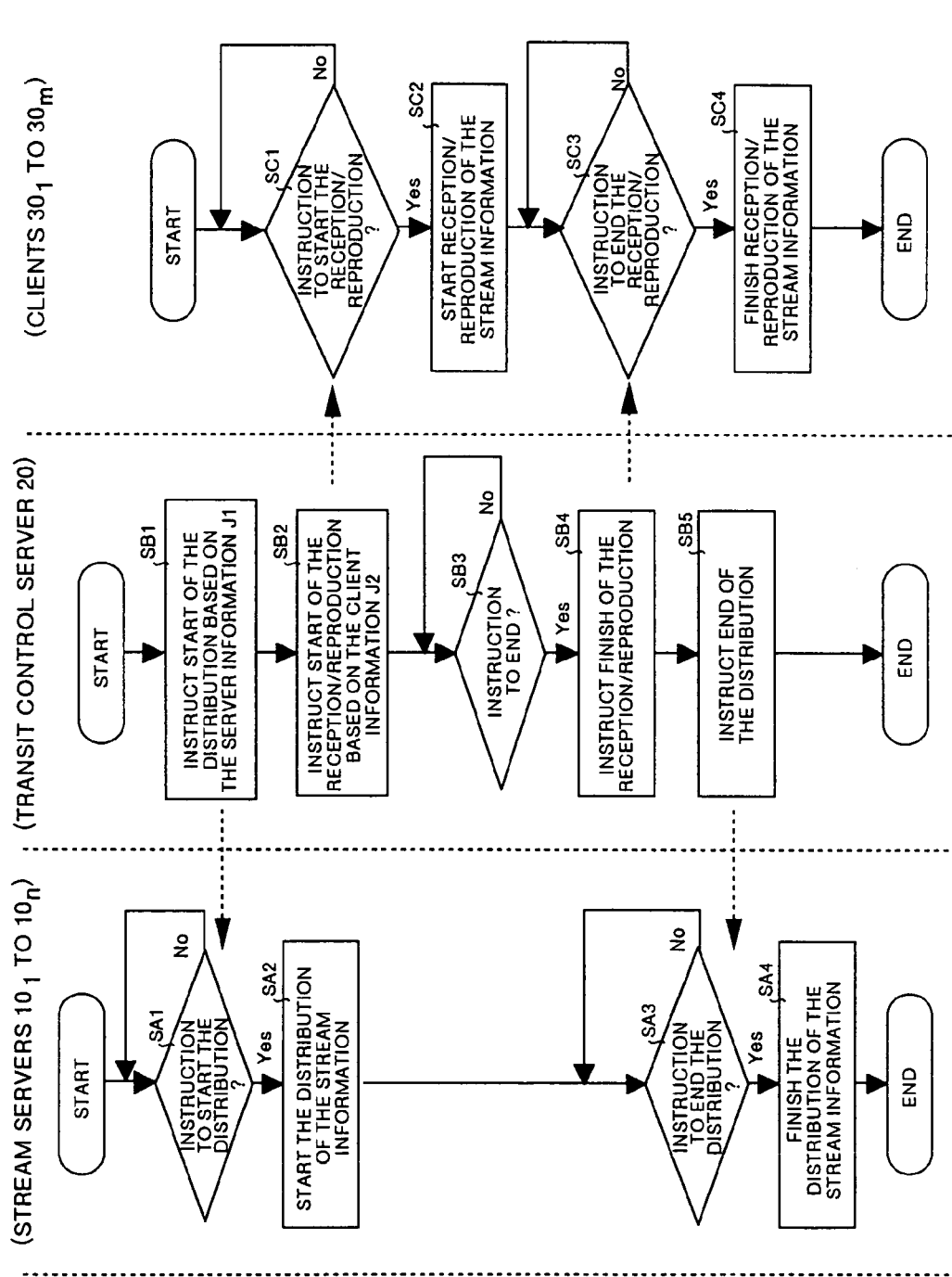
FIG. 6 is a flowchart explaining the operation of the first embodiment according to the present invention.

On the other hand, at the step SE2, the transit control section 24 of the transit control server 20 shown in FIG. 3 dispatches a reception/reproduction instruction to the clients $30_1$ to $30_m$, based on the client information $J_2$ read from the memory device 21, in a similar manner to that at the step SB2 (see FIG. 6). Then, the transit control section 24 proceeds to a step SE3. In this case, the transit control section 24 dispatches the reception/reproduction instruction by taking into consideration the processing capacity of the clients $30_1$ to $30_m$. The reception/reproduction instruction in this case is the instruction to receive the stream information $JS_1$ and $JS_2$, for example, from out of the stream information $JS_1$ to $JS_n$ transmitted to the multicast address based on the server information $J_1$, and to reproduce in real time the received stream information $JS_1$ and $JS_2$. At the step SE3, the transit control section 24 makes a decision as to whether or not there is an instruction from the distributor to end the distribution by using the input device 23. In this case, a decision is made as "No". Then the transit control section 24 proceeds to a step SE4.

At a step SE4, the transit control section 24 makes a decision as to whether or not there is an instruction from the distributor by using the input device 23 for changing the stream information to be received/reproduced by the clients $30_1$ to $30_m$. In this case, a decision is made as "No". Then, the transit control section 24 returns to the step SE3.

Upon receiving the reception/reproduction instruction from the transit control server 20, the respective reception control sections (the reception control section $34_1$: reference to FIG. 5) of the clients $30_1$ to $30_m$ shown in FIG. 5 make a decision as "Yes" at the step SF1, and then proceed to a step SF2. At the step SF2, the respective reception control sections of the clients $30_1$ to $30_m$ start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, in a similar manner to that at the step SC2 (see FIG. 6), and then proceed to a step SF3. At the step SF3, the respective reception control sections of the clients $30_1$ to $30_m$ make a decision as to whether or not there is an instruction from the transit control server 20 to end the reception/reproduction. In this case, the respective reception control sections make a decision as "No", and then proceed to a step SF4. At the step SF4, the respective reception control sections of the clients $30_1$ to $30_m$ make a decision as to whether or not there is an instruction from the transit control server 20 to change the stream information to be received/reproduced. In this case, the respective reception control sections make a decision as "No", and then return to the step SF3.

In this case when the distributor has changed the stream information to be received/reproduced by the clients $30_1$ to $30_m$ from the current stream information $JS_1$ and $JS_2$ to only the stream information $JS_1$, by using the input device 23, the transit control section 24 of the transit control server 20 shown in FIG. 3 makes a decision as "Yes" at the step SF4. The transit control section 24 then proceeds to a step SE5. At the step SE5, the transit control section 24 dispatches a reception/reproduction instruction to the clients $30_1$ to $30_m$ based on the changed contents, and then returns to the step SE3. The reception/reproduction instruction after the change in this case is the instruction to receive only the stream information $JS_1$, for example, from out of the stream information $JS_1$ to $JS_n$, and to reproduce in real time the received stream information $JS_1$.

Upon receiving the reception/reproduction instruction after the change, the respective reception control sections of the clients $30_1$ to $30_m$ make a decision as "Yes" at the step SF4, and then proceed to a step SF5. At the step SF5, the respective reception control sections of the clients $30_1$ to $30_m$ start the reception and reproduction of only the stream information $JS_1$ based on the reception/reproduction instruction after the change, and then return to the step SF3. In other words, in this case, while the clients $30_1$ to $30_m$ have been reproducing in real time both of the stream information $JS_1$ and $JS_2$ before the change, the clients $30_1$ to $30_m$ reproduce in real time only the stream information $JS_1$ after the change.

Then, when the distributor has dispatched an instruction to end the reception/reproduction by using the input device 23, the transit control section 24 of the transit control server 20 shown in FIG. 3 makes a decision as "Yes" at the step SE3, and then proceeds to a step SE6. At the step SE6, the transit control section 24 dispatches an instruction to end the reception/reproduction to the clients $30_1$ to $30_m$ respectively, and then proceeds to a step SE7.

Upon receiving the instruction to end the reception/reproduction, the respective reception control sections of the clients $30_1$ to $30_m$ make a decision as "Yes" at the step SF3, and then proceed to a step SF6. The respective reception control sections of the clients $30_1$ to $30_m$ end the reception and real-time reproduction of the stream information $JS_1$.

At the step SE7, the transit control section 24 instructs the stream servers $10_1$ to $10_n$ to end the distribution. Thus, the respective distribution control sections of the stream servers $10_1$ to $10_n$ make a decision as "Yes" at the step SD3, and then proceed to a step SD4. At the step SD4, the respective distribution control sections of the stream servers $10_1$ to $10_n$ end the distribution of the stream information $JS_1$ to $JS_n$.

As explained above, according to the second embodiment of the invention, it is possible to easily change the control to the clients $30_1$ to $30_m$ by using the input device 23. Therefore, it is possible to improve the easiness of using the apparatus.

In the first embodiment, there has been explained the case where the stream information designated by the transit control server 20 from among the stream information $JS_1$ to $JS_n$ is reproduced in real time by the clients $30_1$ to $30_m$, by the control of the transit control server 20. However, it is also possible to schedule the distribution and reception/reproduction of the stream information based on distribution schedule information $J_3$ shown in FIG. 9.

This case will be explained below as a third embodiment. The hardware configuration of the third embodiment is the same as the hardware configuration of the first embodiment described above. However, in the case of the third embodiment, the function of the transit control server 20 shown in FIG. 1 is different from that of the first embodiment as described later. Further, according to the third embodiment, the distribution schedule information $J_3$ shown in FIG. 9 is stored in the memory device 21 shown in FIG. 1.

The distribution schedule information $J_3$ includes time information on the start/end of the distribution of the stream information (contents) to be distributed, and information on a method of displaying the stream information. This information is composed of "date", "start time", "end time", "contents name 1", "contents name 2" and "display method". The "date" is a date on which the corresponding stream information is distributed. The "start time" is a time when the distribution of the stream information is started. The "end time" is a time when the distribution of the stream information is stopped. The "contents name 1" is a name of contents corresponding to first stream information to be distributed. Similarly, the "contents name 2" is a name of contents corresponding to second stream information to be distributed. The "display method" is a method of displaying (reproducing) the two contents (stream information) by the clients $30_1$ to $30_m$.

At the top row of the drawing, the "date" is defined as "1999.07.30", the "start time" is defined as "12:00.00", the "end time" is defined as "12:30.00", the "contents name 1" is defined as "contents 1", the "contents name 2" is defined as "contents 2", and the "display method" is defined as "lateral parallel display", respectively. In this case, the "lateral parallel display" means to display the contents 1 and 2 in a lateral direction in parallel. The "contents 1" corresponds to the stream information $JS_1$ and the "contents 2" corresponds to the stream information $JS_2$ (not shown).

Figure 8:
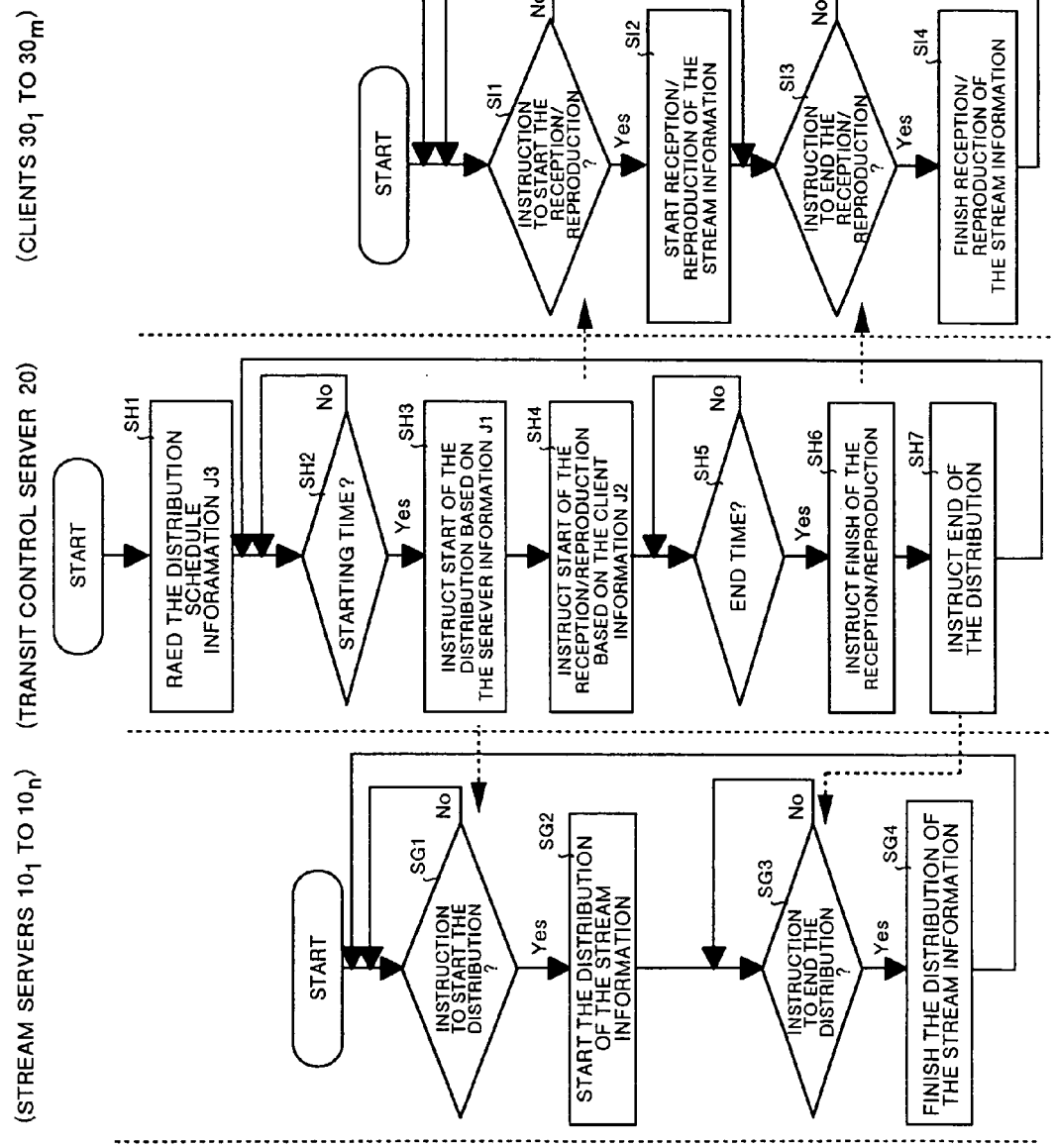
FIG. 8 is a flowchart explaining the operation of a third embodiment according to the present invention.

Next, the operation of the third embodiment will be explained with reference to a flowchart shown in FIG. 8. When the operations of the stream servers $10_1$ to $10_n$ and the clients $30_1$ to $30_m$ in FIG. 1 have been started respectively, these stream servers and clients proceed to a step SG1 and a step SI1 shown in FIG. 8 respectively. At the step SG1, the respective distribution control sections (the distribution control section $15_1$: reference to FIG. 2) of the stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated.

Similarly, at the step SI1, the reception control sections (the reception control section $34_1$: reference to FIG. 5) of the respective clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input by the distributor by using the input device 23 shown in FIG. 3, the transit control section 24 of the transit control server 20 proceeds to a step SH1. At the step SH1, the transit control section 24 reads the distribution schedule information $J_3$ (see FIG. 9) from the memory device 21, and then proceeds to a step SH2. At the step SH2, the transit control section 24 recognizes the "start time" that is nearest to the current time in the distribution schedule information $J_3$, based on a result of the time measured by the timer 27 (the current time). In this case, after recognizing the start time "12:00.00" in the distribution schedule information $J_3$, the transit control section 24 makes a decision as to whether or not the result of the time measured by the timer 27 coincides with the start time "12:00.00". In this case, a decision is made as "No", and the same process of decision making is repeated.

When the result of the time measured by the timer 27 has coincided with the start time "12:00.00", the transit control section 24 makes a decision as "Yes" at the step SH2, and then proceeds to a step SH3. At the step SH3, the transit control section 24 first reads the server information $J_1$ shown in FIG. 4A from the memory device 21. Then, the transit control section 24 recognizes from the server information $J_1$, the "stream servers" (the stream server $10_1$ and $10_2$ (not shown)) as the origins of the distribution of the stream information $JS_1$ and $JS_2$ (not shown) corresponding to the "contents 1" as the content name 1 and the "contents 2" as the contents name 2 shown in FIG. 9.

Further, the transit control section 24 recognizes the multicast address of the respective distribution destinations of the stream information $JS_1$ and $JS_2$ from the server information $J_1$. Next, the transit control section 24 instructs the stream servers $10_1$ and $10_2$ corresponding to the respective stream information $JS_1$ and $JS_2$ to distribute these information, and then proceeds to a step SH4. In this case, the transit control section 24 dispatches the distribution instruction by taking into consideration the traffic volume of the network N and the processing capacity of the clients $30_1$ to $30_m$.

Thus, the distribution control sections of the respective stream servers $10_1$ to $10_1$ (not shown) shown in FIG. 2 make a decision as "Yes" at the step SG1, and then proceed to the next step SG2. At the step SG2, the distribution control sections of the respective stream servers $10_1$ and $10_2$ start the distribution of the stream information $JS_1$ and $JS_2$, and then proceed to a step SG3. Thus, the stream information $JS_1$ and $JS_2$ are distributed to the clients $30_1$ to $30_m$ respectively. At the step SG3, the distribution control sections of the respective stream servers $10_1$ to $10_n$ make a decision as to whether or not there is an instruction to end the distribution from the transit control server 20. In this case, a decision is made as "No", and the same process of decision making is repeated.

On the other hand, at the step SH4, the transit control section 24 of the transit control server 20 shown in FIG. 3 reads the client information $J_2$ (see FIG. 4B) from the memory device 21. Next, the transit control section 24 dispatches a reception/reproduction instruction to the client IP addresses "22.33.44.100" to "22.33.44.199" obtained from this client information $J_2$, that is, to the clients $30_1$ to $30_m$, and then proceeds to a step SH5. In this case, the transit control section 24 dispatches the reception/reproduction instruction by taking into consideration the processing capacity of the clients $30_1$ to $30_m$.

The reception/reproduction instruction in this case is the instruction to receive the stream information $JS_1$ and $JS_2$ transmitted to the multicast address based on the server information $J_1$, and to reproduce in real time the received stream information $JS_1$ and $JS_2$ in a status that these information are displayed in parallel in a lateral direction (see FIG. 9). At the step SH5, the transit control section 24 recognizes the "end time" in the distribution schedule information $J_3$ based on a result of the time measured by the timer 27 (the current time). In this case, after recognizing the end time "12:30.00" in the distribution schedule information $J_3$, the transit control section 24 makes a decision as to whether or not the result of the time measured by the timer 27 coincides with the end time "12:30.00". In this case, a decision is made as "No", and the same process of decision making is repeated.

Upon receiving the reception/reproduction instruction, the respective reception control sections (the reception control section $34_1$: reference to FIG. 5) of the clients $30_1$ to $30_m$ shown in FIG. 5 make a decision as "Yes" at the step SI1, and then proceed to a step SI2. At the step SI2, the respective reception control sections of the clients $30_1$ to $30_m$ start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, and then proceed to a step SI3. Specifically, the respective reception control sections of the clients $30_1$ to $30_m$ restore the stream information $JS_1$ and $JS_2$, thereby to generate the moving picture data and the voice data, and then supply these moving picture data and voice data to the respective display devices (the display device $32_1$: reference to FIG. 5). Thus, the respective display devices of the clients $30_1$ to $30_m$ reproduce in real time the moving picture and voice relating to the "contents 1" and the "contents 2".

At the step SI3, the respective reception control sections of the clients $30_1$ to $30_m$ make a decision as to whether or not there is an instruction to end the reception/reproduction from the transit control server 20. In this case, a decision is made as "No", and the same process of decision making is repeated.

During this period, the stream information $JS_1$ and $JS_2$ are being reproduced in real time.

After the end time "12:30.00" in the distribution schedule information $J_3$ has been recognized, when the result of the time measured by the timer 27 has coincided with the end time "12:30.00", the transit control section 24 of the transit control server 20 makes a decision as "Yes" at the step SH5, and then proceeds to a step SH6. At the step SH6, the transit control section 24 dispatches an instruction to end the reception/reproduction to the clients $30_1$ to $30_m$ respectively, and then proceeds to a step SH7.

Upon receiving the instruction to end the reception/reproduction, the respective reception control sections of the clients $30_1$ to $30_m$ make a decision as "Yes" at the step SI3, and then proceed to a step SI4. At the step SI4, the respective reception control sections of the clients $30_1$ to $30_m$ end the reception and real-time reproduction of the stream information $JS_1$ and $JS_2$, and then return to the step SI1.

At the step SH7, the transit control section 24 instructs the stream servers $10_1$ and $10_2$ to end the distribution, and then returns to the step SH2. Thus, the respective distribution control sections of the stream servers $10_1$ and $10_2$ make a decision as "Yes" at the step SG3, and then proceed to a step SG4. At the step SG4, the respective distribution control sections of the stream servers $10_1$ and $10_2$ end the distribution of the stream information $JS_1$ and $JS_2$, and then return to the step SG1. Thereafter, in a similar manner to that as described above, when a result of time measurement by the timer 27 becomes the "start time", the distribution and reception/reproduction of a predetermined stream information are started, according to the distribution schedule information $J_3$. Also, when a result of time measurement by the timer 27 becomes the "end time", the distribution and reception/reproduction of a predetermined stream information is stopped.

As explained above, according to the third embodiment of the invention, the transit control section 24 carries out the distribution control and the real-time reproduction control based on the distribution schedule information $J_3$. Therefore, it is possible to flexibly cope with a change in the control method, by only changing the schedule information.

In the first embodiment, there has not particularly been explained a window control (a change of a display size, a change of conditions for voice reproduction, etc.) in the display devices $32_1$ to $32_m$ at the side of the clients $30_1$ to $30_m$. However, it is also possible to prohibit the window control based on the control of the transit control server 20. This case will be explained below as a fourth embodiment. The hardware configuration of the fourth embodiment is the same as the hardware configuration of the first embodiment. However, in the case of the fourth embodiment, the function of the transit control server 20 shown in FIG. 1 is different from that of the first embodiment as described later.

Next, the operation of the fourth embodiment will be explained with reference to a flowchart shown in FIG. 10. In this drawing, the operations carried out in the steps other than steps SK2 and SL2 are similar to the operations carried out in the steps other than the steps SB2 and SC2 shown in FIG. 6.

Figure 10:
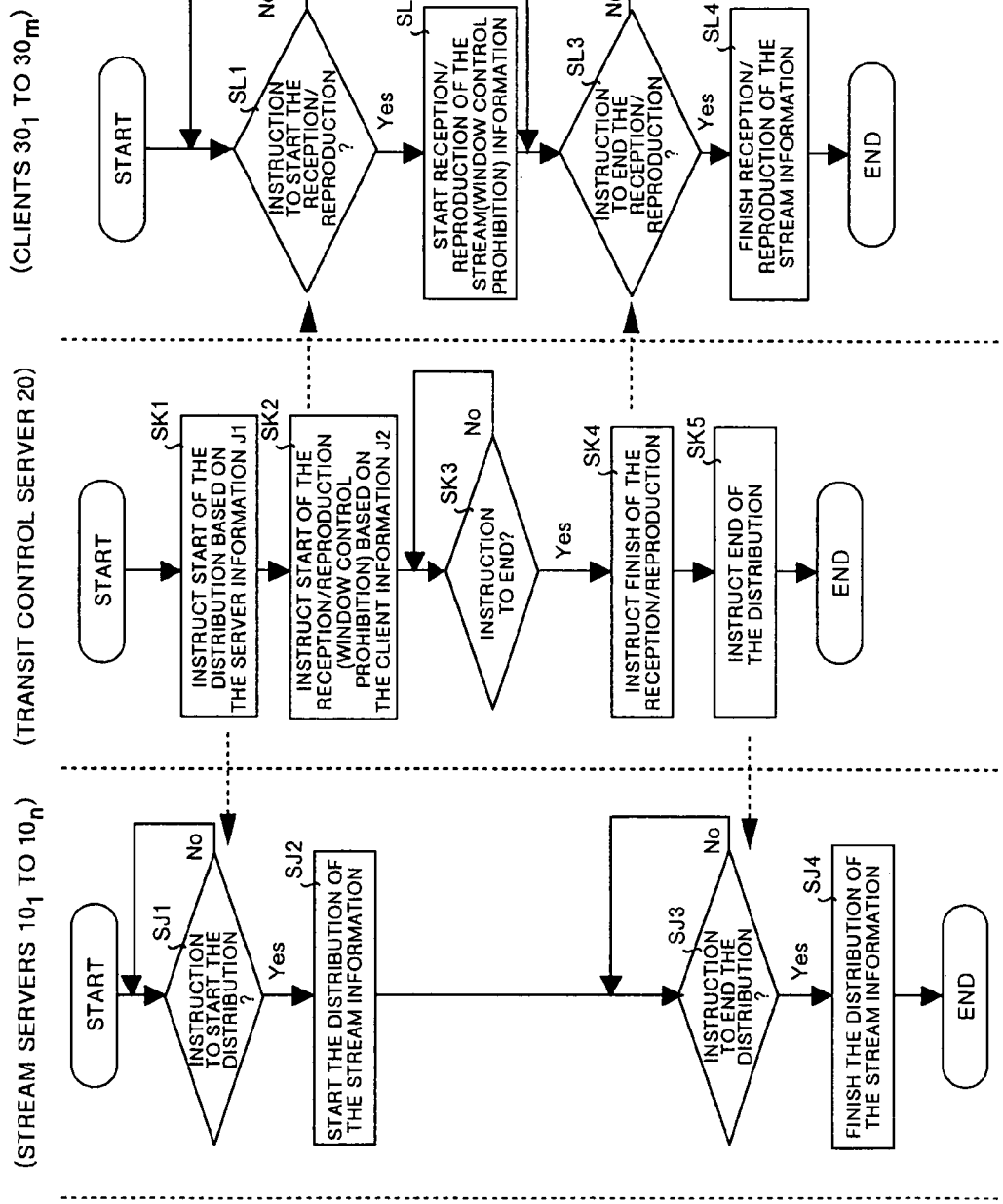
FIG. 10 is a flowchart explaining the operation of a fourth embodiment according to the present invention.

When the operations of the stream servers $10_1$ to $10_1$ and the clients $30_1$ to $30_m$ in FIG. 1 have been started respectively, these stream servers and clients proceed to a step SJ1 and a step SL1 shown in FIG. 10 respectively. At the step SJ1, the distribution control sections of the respective stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated. Similarly, at the step SL1, the respective reception control sections of the clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input, the transit control section 24 (see FIG. 3) of the transit control server 20 proceeds to a step SK1. At the step SK1, the transit control section 24 recognizes from the server information $J_1$ (see FIG. 4A) read from the memory device 21, the "stream servers" (the stream servers $10_1$ to $10_n$) as the origins of the distribution of the respective stream information $JS_1$ to $JS_n$. Further, the transit control section 24 recognizes the multicast address of the respective distribution destinations of the stream information $JS_1$ to $JS_n$) from the server information $J_1$. Next, the transit control section 24 instructs the stream servers $10_1$ to $10_n$ corresponding to the respective stream information $JS_1$ to $JS_n$ to distribute these information, and then proceeds to a step SK2. In this case, the transit control section 24 dispatches the distribution instruction by taking into consideration the traffic volume of the network N and the processing capacity of the clients $30_1$ to $30_m$.

Thus, the distribution control sections of the respective stream servers $10_1$ to $10_1$ shown in FIG. 1 make a decision as "Yes" at the step SJ1, and then proceed to the next step SJ2. At the step SJ2, the distribution control sections of the respective stream servers $10_1$ to $10_n$ start the distribution of the stream information $JS_1$ to $JS_n$ and then proceed to a step SJ3. At the step SJ3, the distribution control sections of the respective stream servers $10_1$ to $10_n$ make a decision as to whether or not there is an instruction to end the distribution from the transit control server 20. In this case, a decision is made as "No", and the same process of decision making is repeated.

On the other hand, at the step SK2, the transit control section 24 shown in FIG. 3 dispatches a reception/reproduction instruction to the clients $30_1$ to $30_m$, based on the client information $J_2$ (see FIG. 4B) read from the memory device 21, and then proceeds to a step SK3. In this case, the transit control section 24 dispatches the reception/reproduction instruction by taking into consideration the processing capacity of the clients $30_1$ to $30_m$. The reception/reproduction instruction in this case is the instruction to receive the stream information $JS_1$ and $JS_2$ (not shown), to reproduce in real time the received stream information $JS_1$ and $JS_2$, and to prohibit the window control.

In this case, the window control refers to a control relating to a change of a size for displaying a moving picture, a change of conditions for reproducing voice, etc. in the case of real-time reproducing the stream information in the display devices $32_1$ to $32_m$. The conditions for reproducing voice refers to conditions relating to a reproduction of voice in the stream information $JS_1$ and the stream information $JS_2$, such as, for example, a ratio of voice volume between the two stream information. At the step SK3, the transit control section 24 makes a decision as to whether or not there is an instruction to end the distribution. In this case, a decision is made as "No", and the same process of decision making is repeated.

Upon receiving the reception/reproduction instruction, the respective reception control sections of the clients $30_1$ to $30_m$ make a decision as "Yes" at the step SL1, and then proceed to a step SL2. At the step SL2, the respective reception control sections of the clients $30_1$ to $30_m$ start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, and then proceed to a step SL3. Specifically, the respective reception control sections of the clients $30_1$ to $30_m$ restore the stream information $JS_1$ and $JS_2$, thereby to generate the moving picture data and the voice data, and then supply these moving picture data and voice data to the respective display devices $32_1$ to $32_m$. With this arrangement, the display devices $32_1$ to $32_m$ reproduce in real time the moving picture and voice relating to the "contents 1" and the "contents 2" respectively.

However, in this case, as the window control at the clients $30_1$ to $30_m$ is prohibited as described above, it is not possible to change the display size of the moving picture or to change the voice reproduction conditions. Accordingly, at the display devices $32_1$ to $32_m$, the moving picture is reproduced in real time in the same display size and, at the same time, the voice is reproduced in real time in the same conditions.

At the step SL3, the respective reception control sections of the clients $30_1$ to $30_m$ make a decision as to whether or not there is an instruction to end the reception/reproduction from the transit control server 20. In this case, a decision is made as "No", and the same process of decision making is repeated. When the end instruction has been dispatched, the transit control section 24 of the transit control server 20 shown in FIG. 3 makes a decision as "Yes" at the step SK3, and then proceeds to a step SK4. At the step SK4, the transit control section 24 dispatches an instruction to end the reception/reproduction to the clients $30_1$ to $30_m$, and then proceeds to a step SK5. Then, the respective reception control sections of the clients $30_1$ to $30_m$ make a decision as "Yes" at the step SL3, and then proceed to a step SL4. Thus, the reception and the real-time reproduction of the stream information $JS_1$ and $JS_2$ is stopped.

Further, at the step SK5, the transit control section 24 dispatches an instruction to end the distribution, to the stream servers $10_1$ to $10_n$. Thus, the respective distribution control sections of the stream servers $10_1$ to $10_n$ make a decision as "Yes" at the step SJ3, and then proceed to a step SJ4. At the step SJ4, the respective distribution control sections of the stream servers $10_1$ to $10_n$ end the distribution of the stream information $JS_1$ to $JS_n$.

As explained above, according to the fourth embodiment of the invention, the same control is carried out to the clients $30_1$ to $30_m$, and an external control on the reproduction is prohibited. Therefore, it is possible to carry out a real-time reproduction in the status of maintaining the constant reproduction quality.

In the fourth embodiment, there has been explained the case where the window control (a change of a display size, a change of conditions for voice reproduction, etc.) at the side of the clients $30_1$ to $30_m$ is prohibited based on the control of the transit control server 20. However, it is also possible to permit this window control. This case will be explained below as a fifth embodiment. The hardware configuration of the fifth embodiment is the same as the hardware configuration of the first embodiment. However, in the case of the fifth embodiment, the function of the transit control server 20 shown in FIG. 1 is different from that of the first embodiment as described later.

Next, the operation of the fifth embodiment will be explained with reference to a flowchart shown in FIG. 11. In this drawing, the operations carried out in the steps other than steps SN2 and SO2 are similar to the operations carried out in the steps other than the steps SK2 and SL2 shown in FIG. 10.

Figure 11:
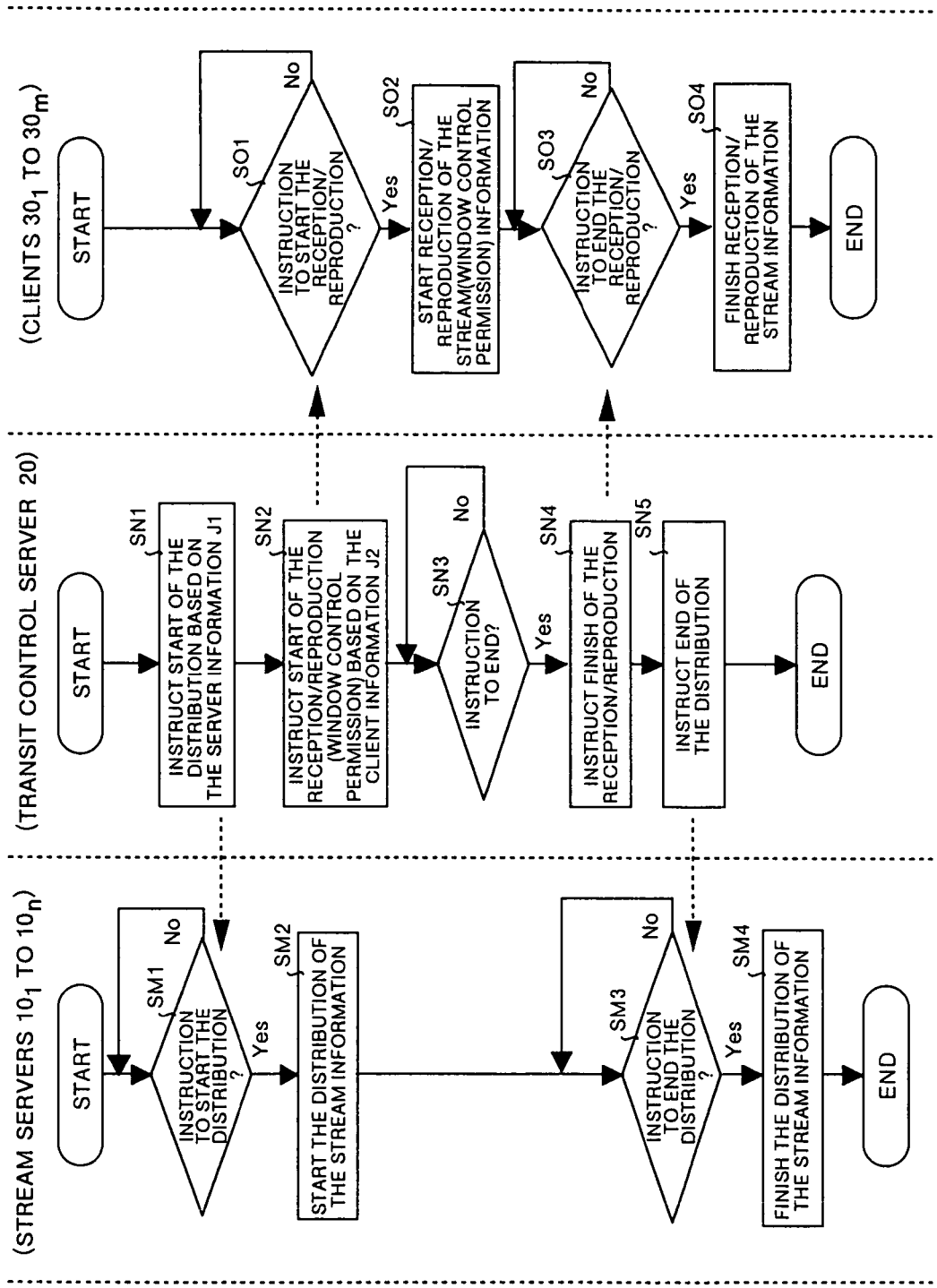
FIG. 11 is a flowchart explaining the operation of a fifth embodiment according to the present invention.

That is, when the operations of the stream servers $10_1$ to $10_n$ and the clients $30_1$ to $30_m$ in FIG. 1 have been started respectively, these stream servers and clients proceed to a step SM1 and a step SO1 shown in FIG. 11 respectively. At the step SM1, the distribution control sections of the respective stream servers $10_1$ to $10_1$ shown in FIG. 1 make a decision "No", and the same process of decision making is repeated. Similarly, at the step SO1, the respective reception control sections of the clients $30_1$ to $30_m$ make a decision as "No", and the same process of decision making is repeated.

Then, when the information for instructing the start of distribution has been input, the transit control section 24 of the transit control server 20 proceeds to a step SN1. At the step SN1, the transit control section 24 recognizes the stream servers $10_1$ to $10_n$ from the server information $J_1$ read from the memory device 21, and further recognizes the multicast address. Next, the transit control section 24 instructs the stream servers $10_1$ to $10_1$ corresponding to the respective stream information $JS_1$ to $JS_n$ to distribute these information, and then proceeds to a step SN2. In this case, the transit control section 24 dispatches the distribution instruction by taking into consideration the traffic volume of the network N and the processing capacity of the clients $30_1$ to $30_m$.

Thus, the distribution control sections of the respective stream servers $10_1$ to $10_n$ shown in FIG. 1 make a decision as "Yes" at the step SM1, and then proceed to a step SM2. At the step SM2, the distribution control sections of the respective stream servers $10_1$ to $10_n$ start the distribution of the stream information $JS_1$ to $JS_n$, and then proceed to a step SM3. At the step SM3, the distribution control sections of the respective stream servers $10_1$ to $10_n$ make a decision as "No", and the same process of decision making is repeated.

On the other hand, at the step SN2, based on the client information $J_2$ read from the memory device 21, the transit control section 24 shown in FIG. 3 dispatches a reception/reproduction instruction to the clients $30_1$ to $30_m$, and then proceeds to a step SN3. In this case, the transit control section 24 dispatches the reception/reproduction instruction by taking into consideration the processing capacity of the clients $30_1$ to $30_m$. The reception/reproduction instruction in this case is the instruction to receive the stream information $JS_1$ and $JS_2$ (not shown), reproduce in real time the received stream information $JS_1$ and $JS_2$, and to permit the window control. At the step SN3, the transit control section 24 makes a decision as "No", and the same process of decision making is repeated.

Upon receiving the reception/reproduction instruction, the respective reception control sections of the clients $30_1$ to $30_m$ make a decision as "Yes" at the step SO1, and then proceed to a step SO2. At the step SO2, the respective reception control sections of the clients $30_1$ to $30_m$ start the reception of the stream information $JS_1$ and $JS_2$ designated by the transit control server 20. Next, the respective reception control sections of the clients $30_1$ to $30_m$ start the real-time reproduction of the stream information $JS_1$ and $JS_2$, and then proceed to a step SO3. With this arrangement, the display devices $32_1$ to $32_m$ reproduce in real time the moving picture and voice relating to the "contents 1" and the "contents 2" respectively.

However, in this case, as the window control at the clients $30_1$ to $30_m$ is permitted as described above, it is possible to change the display size of the moving picture or to change the voice reproduction conditions. Accordingly, at the display devices $32_1$ to $32_m$, the moving picture is reproduced in real time in various display sizes and, at the same time, the voice is reproduced in real time under various conditions by the window control.

At the step SO3, the respective reception control sections of the clients $30_1$ to $30_m$ make a decision as "No", and the same process of decision making is repeated. When the end instruction has been dispatched, the transit control section 24 of the transit control server 20 shown in FIG. 3 makes a decision as "Yes" at the step SN3, and then proceeds to a step SN4. At the step SN4, the transit control section 24 dispatches an instruction to end the reception/reproduction to the clients $30_1$ to $30_m$, and then proceeds to a step SN5. Then, the respective reception control sections of the clients $30_1$ to $30_m$ make a decision as "Yes" at the step SO3, and then proceed to a step SO4. Thus, the reception and the real-time reproduction of the stream information $JS_1$ and $JS_2$ is stopped.

Further, at the step SN5, the transit control section 24 dispatches an instruction to end the distribution, to the stream servers $10_1$ to $10_n$. Thus, the respective distribution control sections of the stream servers $10_1$ to $10_n$ make a decision as "Yes" at the step SM3, and then proceed to a step SM4. At the step SM4, the respective distribution control sections of the stream servers $10_1$ to $10_n$ end the distribution of the stream information $JS_1$ to $JS_n$.

As explained above, according to the fifth embodiment of the invention, an external control relating to the reproduction at the clients $30_1$ to $30_m$ is permitted. Therefore, it is possible to carry out a flexible real-time reproduction.

In the first embodiment, there has been explained the case where the stream information $JS_1$ to $JS_n$ are distributed directly from the stream servers $10_1$ to $10_n$ to the multicast address (the clients $30_1$ to $30_m$). However, it is also possible to arrange such that the transit control server 20 once receives the stream information $JS_1$ to $JS_n$, edits these information, and then distributes the edited information to the multicast address as the edit stream information. This case will be explained below as a sixth embodiment. The hardware configuration of the sixth embodiment is the same as the hardware configuration of the first embodiment. However, in the case of the sixth embodiment, the function of the transit control server 20 shown in FIG. 1 is different from that of the first embodiment as described later.

Figure 12:
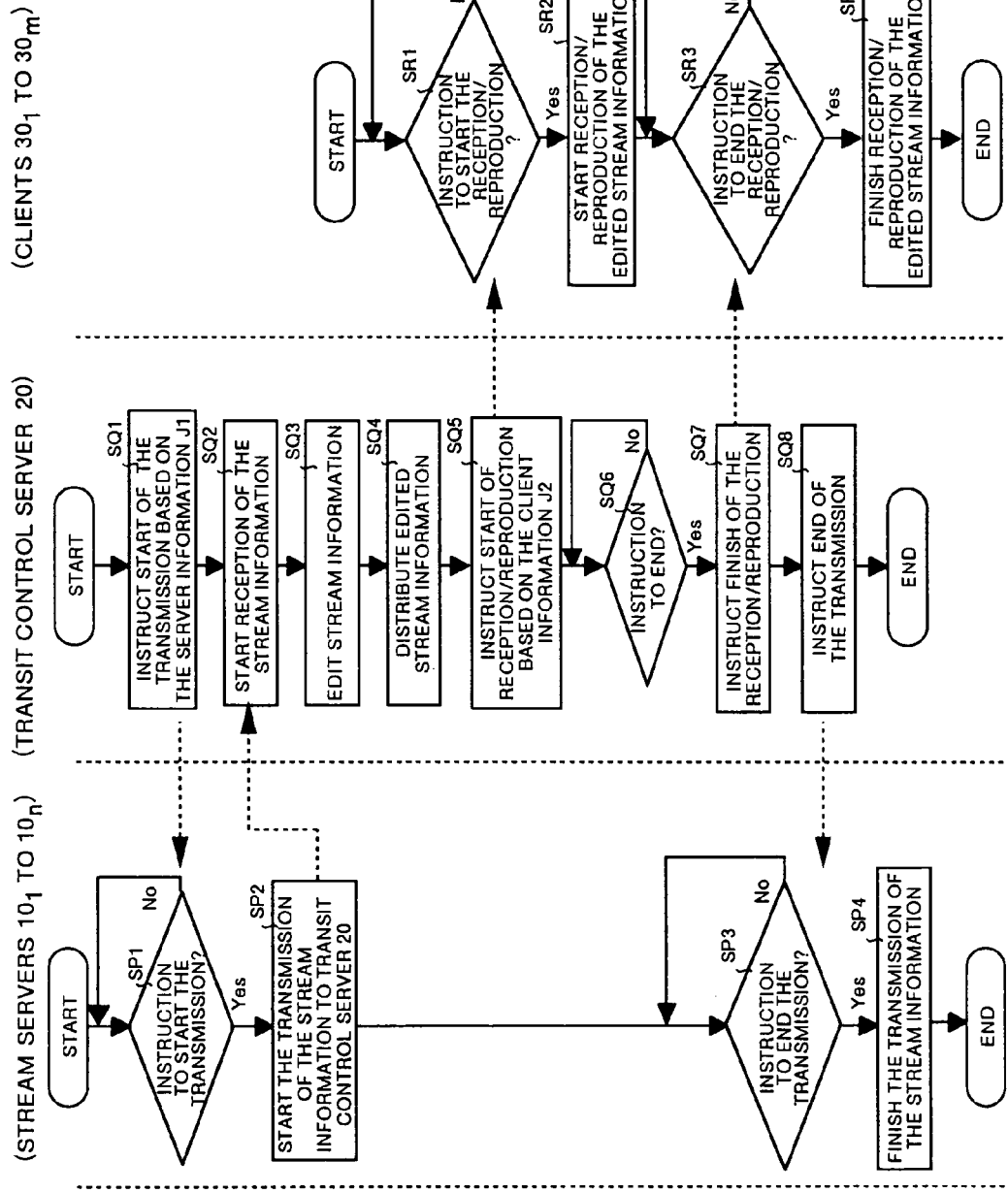
FIG. 12 is a flowchart explaining the operation of a sixth embodiment according to the present invention.

Next, the operation of the sixth embodiment will be explained with reference to a flowchart shown in FIG. 12. When the operations of the stream servers $10_1$ to $10_1$ and the clients $30_1$ to $30_m$ in FIG. 1 have been started respectively, these stream servers and clients proceed to a step SP1 and a step SR1 shown in FIG. 12 respectively. At the step SP1, the respective distribution control sections of the stream servers $10_1$ to $10_n$ shown in FIG. 1 make a decision as to whether or not there is an instruction to start the transmission of the stream information $JS_1$ to $JS_n$ from the transit control server 20. In this case, a decision is made as "No", and the same process of decision making is repeated. The transmission instruction in this case is the instruction to transmit the stream information $JS_1$ to $JS_n$ to the transit control server 20. At the step SR1, the respective reception control sections of the clients $30_1$ to $30_m$ make a decision as to whether or not there is an instruction to start the reception/reproduction of the stream information $JS_1$ to $JS_n$ from the transit control server 20. In this case, a decision is made as "No", and the same process of decision making is repeated.

When the instruction to start the distribution has been input, the transit control section 24 of the transit control server 20 proceeds to a step SQ1. At the step SQ1, the transit control section 24 instructs the stream servers $10_1$ to $10_n$ to start transmitting the stream information $JS_1$ to $JS_n$ to the own IP address, based on the server information $J_1$ (see FIG. 4A) read from the memory device 21, and then proceeds to a step SQ2. In this case, the transit control section 24 dispatches this instruction by taking into consideration the traffic volume of the network N. As an alternative example of instruction, the transit control section 24 may instruct any one optional stream server out of the stream servers $10_1$ to $10_n$ to start transmitting the stream information $JS_1$ to $JS_n$ to the own IP address. Further, as still another example of instruction, the transit control section 24 may instruct the stream servers $10_1$ to $10_n$ to start transmitting the stream information $JS_1$ to $JS_n$ to the multicast address to which the transit control server 20 belongs.

When the starting of the transmission has been instructed, the respective distribution control sections of the stream servers $10_1$ to $10_n$ make a decision as "Yes" at the step SP1, and then proceed to a step SP2. At the step SP2, the respective distribution control sections of the stream servers $10_1$ to $10_n$ start transmitting the stream information $JS_1$ to $JS_n$ to the IP address of the transit control server 20, and then proceed to a step SP3. At the step SP3, the respective distribution control sections of the stream servers $10_1$ to $10_n$ make a decision as to whether or not there is an instruction to end the transmission of the stream information $JS_1$ to $JS_n$ from the transit control server 20. In this case, a decision is made as "No", and the same process of decision making is repeated.

On the other hand, at the step SQ2, the transit control section 24 shown in FIG. 3 starts receiving the stream information $JS_1$ to $JS_n$ transmitted from the stream servers $10_1$ to $10_n$, and then proceeds to the step SQ3. At the step SQ3, the transit control section 24 edits the received stream information $JS_1$ to $JS_n$, thereby to generate the edit stream information, and writes this edit stream information in a memory in which a high-speed writing and reading is possible (not shown). As one example of the editing, the transit control section 24 converts the stream information $JS_1$ to $JS_4$ (not shown), for example, out of the stream information $JS_1$ to $JS_n$, into bit map data of a quarter of the original size for each frame of the moving picture, and writes the data into the memory so that the data become the original size.

That is, the transit control section 24 compresses the bit map data relating to four frames obtained from the stream information $JS_1$ to $JS_n$, into a quarter of the original sizes respectively. Then, the transit control section 24 writes the bit map data relating to the four frames compressed into the quarter of the original sizes, into a matrix layout of two in a vertical direction and two in a lateral direction. In this case, the total size of the four bits written in the memory corresponds to the original size of one frame.

Then, at the step SQ4, the transit control section 24 recognizes from the server information $J_1$, the multicast addresses "239.0.10.100" to "239.0.10.199" that are the respective distribution destinations of the stream information $JS_1$ to $JS_n$. Next, the transit control section 24 reads the bit map data (corresponding to the original size of one frame) from the memory, and distributes this bit map data to the multicast addresses. Then, the transit control section 24 proceeds to a step SQ5.

At the step SQ5, the transit control section 24 dispatches the reception/reproduction instruction to the clients $30_1$ to $30_m$ based on the client information $J_2$ read from the memory device 21, and then proceeds to a step SQ6. In this case, the transit control section 24 dispatches this instruction by taking into consideration the processing capacity of the clients $30_1$ to $30_m$. The reception/reproduction instruction in this case is the instruction to receive the edit stream information, and to reproduce in real time the received edit stream information. At the step SQ6, the transit control section 24 makes a decision as to whether or not there is an instruction from the distributor to end the distribution. In this case, a decision is made as "No", and the same process of decision making is repeated.

Upon receiving the reception/reproduction instruction, the respective reception control sections of the clients $30_1$ to $30_m$ make a decision as "Yes" at the step SR1, and then proceed to a step SR2. At the step SR2, the respective reception control sections of the clients $30_1$ to $30_m$ start the reception of the edit stream information distributed from the transit control server 20. After starting the real-time reproduction of the edit stream information, the respective reception control sections of the clients $30_1$ to $30_m$ proceed to a step SR3. With this arrangement, the display devices $32_1$ to $32_m$ reproduce in real time the compressed four contents (the moving picture) within one frame, and also reproduce in real time the voice relating to the four contents.

At the step SR3, the respective reception control sections of the clients $30_1$ to $30_m$ make a decision as to whether or not there is an instruction to end the reception and reproduction. In this case, the respective reception control sections of the clients $30_1$ to $30_m$ make a decision as "No", and repeat the same process of decision making. When the end instruction has been dispatched, the transit control section 24 of the transit control server 20 shown in FIG. 3 makes a decision as "Yes" at the step SQ6, and then proceeds to a step SQ7. At the step SQ7, the transit control section 24 dispatches an instruction to end the reception/reproduction to the clients $30_1$ to $30_m$, and then proceeds to a step SQ8. Then, the respective reception control sections of the clients $30_1$ to $30_m$ make a decision as "Yes" at the step SR3, and then proceed to a step SR4. Thus, the reception and the real-time reproduction of the edit stream information is stopped.

Further, at the step SQ8, the transit control section 24 dispatches to the stream servers $10_1$ to $10_n$ an instruction to end the transmission relating to the distribution of the stream information $JS_1$ to $JS_n$ to the own address. At the same time, the transit control section 24 ends the distribution of the edit stream information. Thus, the respective distribution control sections of the stream servers $10_1$ to $10_n$ make a decision as "Yes" at the step SP3, and then proceed to a step SP4. At the step SP4, the respective distribution control sections of the stream servers $10_1$ to $10_n$ end the transmission of the stream information $JS_1$ to $JS_n$.

As explained above, according to the sixth embodiment of the invention, the edited stream information is distributed to the clients $30_1$ to $30_m$ by the control of the transit control section 24. Therefore, as compared with the case of distributing the stream information to the clients $30_1$ to $30_m$, it is possible to decrease the traffic volume of the network N.

In the sixth embodiment, there has been explained the case where the transit control server 20 edits the stream information $JS_1$ to $JS_n$, and then distributes the edited information to the multicast address as the edit stream information. However, it is also possible to arrange such that the stream servers $10_1$ to $10_n$ edit the stream information $JS_1$ to $JS_n$ respectively, and then distribute the edited information as the edit stream information. This case will be explained below as a seventh embodiment. The hardware configuration of the seventh embodiment is the same as the hardware configuration of the first embodiment. However, in the case of the seventh embodiment, the function of the transit control server 20 and the functions of the stream servers $10_1$ to $10_n$ shown in FIG. 1 are different from those of the first embodiment as described later.

Figure 13:
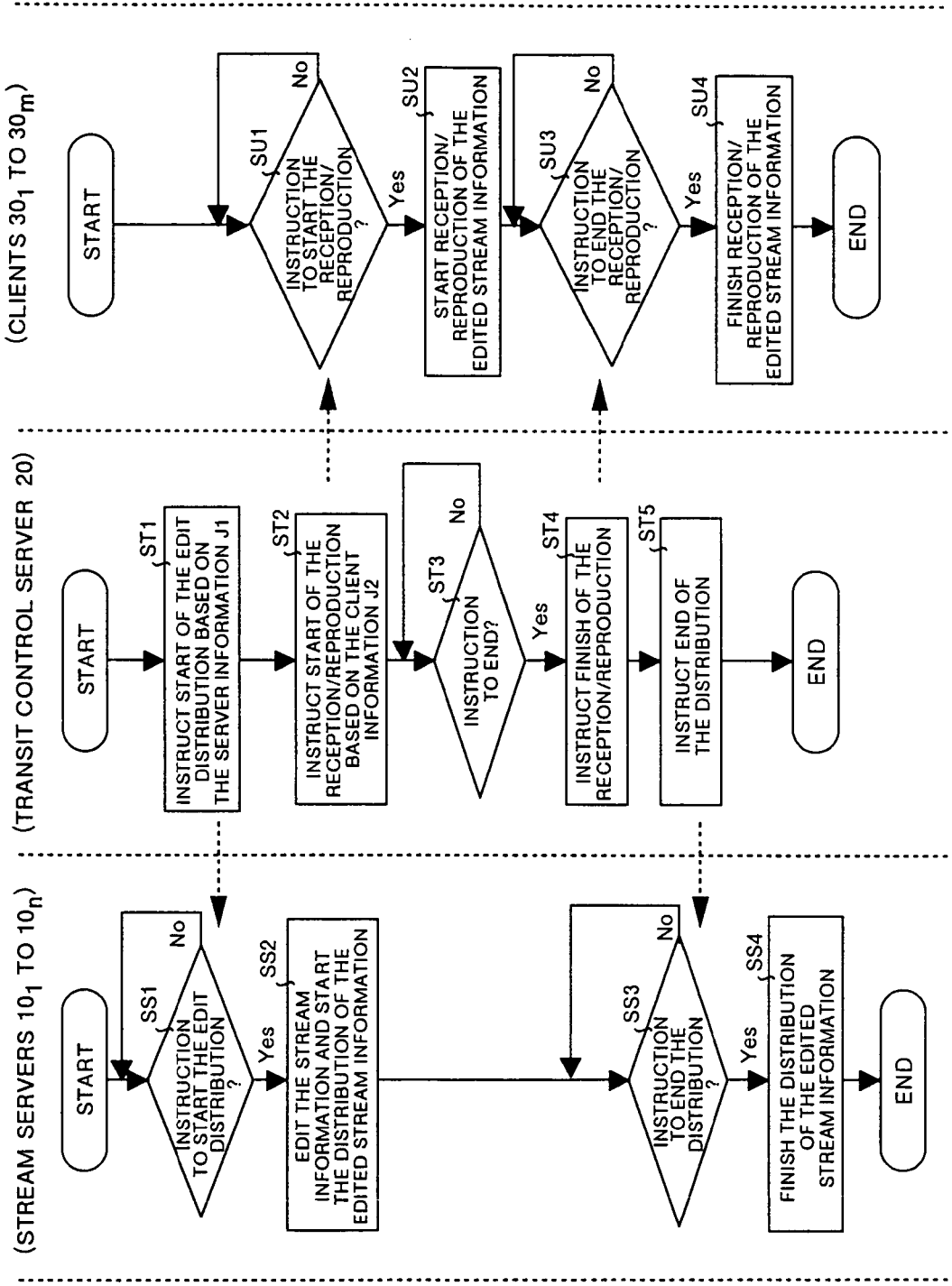
FIG. 13 is a flowchart explaining the operation of a seventh embodiment according to the present invention.

Next, the operation of the seventh embodiment will be explained with reference to a flowchart shown in FIG. 13. When the operations of the stream servers $10_1$ to $10_1$ and the clients $30_1$ to $30_m$ in FIG. 1 have been started respectively, these stream servers and clients proceed to a step SS1 and a step SU1 shown in FIG. 13 respectively. At the step SS1, the respective distribution control sections of the stream servers $10_1$ to $10_n$ shown in FIG. 1 make a decision as to whether or not there is an instruction to start the edit distribution from the transit control server 20. In this case, a decision is made as "No", and the same process of decision making is repeated.

The edit distribution in this case is the instruction to distribute to the clients $30_1$ to $30_m$ the edit stream information that are the stream information $JS_1$ to $JS_N$ of which display sizes or the like have been edited respectively. At the step SU1, the respective reception control sections of the clients $30_1$ to $30_m$ make a decision as to whether or not there is an instruction to start the reception/reproduction from the transit control server 20. In this case, a decision is made as "No", and the same process of decision making is repeated.

When the instruction to start the distribution has been input, the transit control section 24 of the transit control server 20 proceeds to a step ST1. At the step ST1, the transit control section 24 instructs the stream servers $10_1$ to $10_1$ to start distributing the edit stream information based on the server information $J_1$ (see FIG. 4A) read from the memory device 21, and then proceeds to a step ST2. In this case, the transit control server 20 dispatches an instruction to edit (reduce) the display sizes of the stream information $JS_1$ to $JS_n$ to 160 dots in width times 120 dots in length, for example. In this case, the transit control section 24 dispatches this instruction by taking into consideration the traffic volume of the network N and the processing capacity of the clients $30_1$ to $30_m$.

When the instruction to start the edit distribution has been dispatched, the respective distribution control sections of the stream servers $10_1$ to $10_1$ make a decision as "Yes" at the step SS1, and then proceed to a step SS2. At the step SS2, the respective distribution control sections of the stream servers $10_1$ to $10_n$ edit the display sizes of the stream information $JS_1$ to $JS_n$ to 160 dots in width times 120 dots in length, for example. Next, the respective distribution control sections of the stream servers $10_1$ to $10_n$ start transmitting the edit stream information to the multicast address, and then proceed to a step SS3. At the step SS3, the respective distribution control sections of the stream servers $10_1$ to $10_n$ make a decision as to whether or not there is an instruction to end the transmission of the edit stream information from the transit control server 20. In this case, a decision is made as "No", and the same process of decision making is repeated.

On the other hand, at the step ST2, the transit control section 24 of the transit control server 20 dispatches a reception/reproduction instruction to the clients $30_1$ to $30_m$, based on the client information $J_2$ (see FIG. 4B) read from the memory device 21, and then proceeds to the step ST3. In this case, the transit control section 24 dispatches this instruction by taking into consideration the processing capacity of the clients $30_1$ to $30_m$.

The reception/reproduction instruction in this case is the instruction to receive from the stream servers $10_1$ to $10_4$ (not shown) four edit stream information, for example, from out of a plurality of edit stream information transmitted to the multicast address based on the server information $J_1$, and to reproduce in real time the four received edit stream information. At the step ST3, the transit control section 24 makes a decision as to whether or not there is an instruction from the distributor to end the distribution. In this case, a decision is made as "No", and the same process of decision making is repeated.

Upon receiving the reception/reproduction instruction, the respective reception control sections of the clients $30_1$ to $30_m$ make a decision as "Yes" at the step SU1, and then proceed to a step SU2. At the step SU2, the respective reception control sections of the clients $30_1$ to $30_m$ start the reception of the four edit stream information distributed from the stream servers $10_1$ to $10_4$ (not shown). After starting the real-time reproduction of the four edit stream information, the respective reception control sections of the clients $30_1$ to $30_m$ proceed to a step SU3. With this arrangement, the display devices $32_1$ to $32_m$ reproduce in real time the compressed four contents (the moving picture) within one frame, and also reproduce in real time the voice relating to the four contents.

At the step SU3, the respective reception control sections of the clients $30_1$ to $30_m$ make a decision as to whether or not there is an instruction to end the reception/reproduction. In this case, the respective reception control sections of the clients $30_1$ to $30_m$ make a decision as "No", and repeat the same process of decision making. When the end instruction has been dispatched, the transit control section 24 of the transit control server 20 shown in FIG. 3 makes a decision as "Yes" at the step ST3, and then proceeds to a step ST4. At the step ST4, the transit control section 24 dispatches an instruction to end the reception/reproduction to the clients $30_1$ to $30_m$, and then proceeds to a step ST5. Then, the respective reception control sections of the clients $30_1$ to $30_m$ make a decision as "Yes" at the step SU3, and then proceed to a step SU4. Thus, the reception and the real-time reproduction of the edit stream information is stopped.

Further, at the step ST5, the transit control section 24 dispatches to the stream servers $10_1$ to $10_n$ an instruction to end the distribution relating to the edit stream information. Thus, the respective distribution control sections of the stream servers $10_1$ to $10_n$ make a decision as "Yes" at the step SS3, and then proceed to a step SS4. At the step SS4, the respective distribution control sections of the stream servers $10_1$ to $10_n$ end the transmission of the edit stream information.

As explained above, according to the seventh embodiment of the invention, the edited stream information is distributed to the clients $30_1$ to $30_m$ from the stream servers $10_1$ to $10_1$ by the control of the transit control section 24. Therefore, as compared with the case of distributing the stream information to the clients $30_1$ to $30_m$, it is possible to decrease the traffic volume of the network N.

In the seventh embodiment, there has been explained the case where the stream servers $10_1$ to $10_1$ edit the stream information $JS_1$ to $JS_n$ respectively, and then distribute the edited information to the multicast address as the edit stream information. However, it is also possible to arrange such that the start/end instruction of the edit distribution to the stream servers $10_1$ to $10_n$ is carried out by a simultaneous multi-address instruction. This case will be explained below as an eighth embodiment. The hardware configuration of the eighth embodiment is the same as the hardware configuration of the first embodiment. However, in the case of the eighth embodiment, the function of the transit control server 20 and the functions of the stream servers $10_1$ to $10_1$ shown in FIG. 1 are different from those of the first embodiment as described later.

Figure 14:
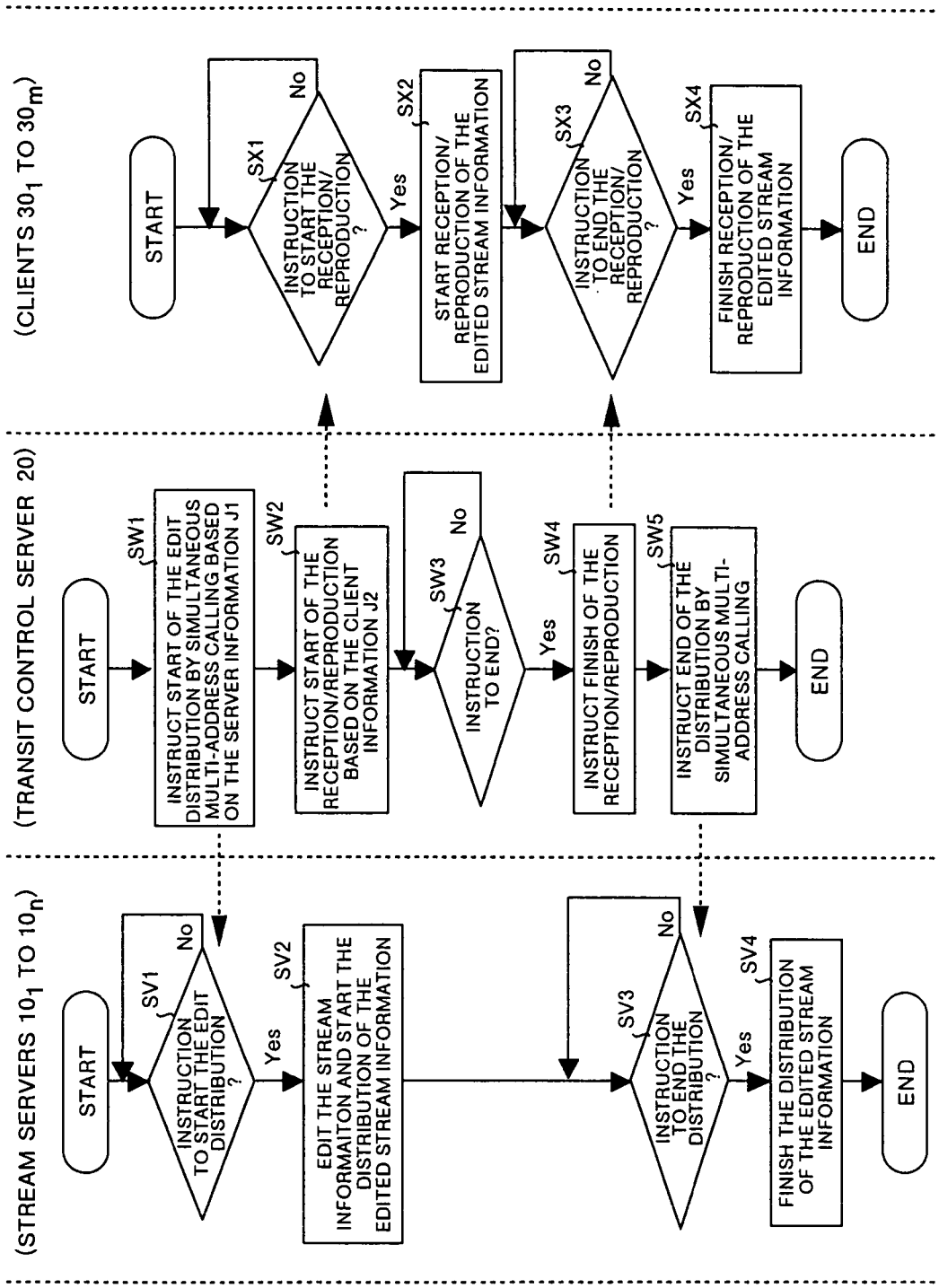
FIG. 14 is a flowchart explaining the operation of an eighth embodiment according to the present invention.

Next, the operation of the eighth embodiment will be explained with reference to a flowchart shown in FIG. 14. In this drawing, the operations carried out in the steps other than steps SW1 and SW5 are similar to the operations carried out in the steps other than the steps ST1 and ST5 shown in FIG. 13 respectively. When the operations of the stream servers $10_1$ to $10_n$ and the clients $30_1$ to $30_m$ have been started respectively, these stream servers and clients proceed to a step SV1 and a step SX1 shown in FIG. 14 respectively.

At the step SV1, the respective distribution control sections of the stream servers $10_1$ to $10_n$ shown in FIG. 1 make a decision as to whether or not there is an instruction to start the edit distribution from the transit control server 20. In this case, a decision is made as "No", and the same process of decision making is repeated. Further, at the step SX1, the respective reception control sections of the clients $30_1$ to $30_m$ make a decision as to whether or not there is an instruction to start the reception/reproduction from the transit control server 20. In this case, a decision is made as "No", and the same process of decision making is repeated.

When the information for instructing the starting of the distribution has been input, the transit control section 24 of the transit control server 20 proceeds to a step SW1. At the step SW1, the transit control section 24 instructs the stream servers $10_1$ to $10_n$ by simultaneous multi-address calling to start distributing the edit stream information based on the server information $J_1$ (see FIG. 4A) read from the memory device 21, and then proceeds to a step SW2. In this case, the transit control server 20 dispatches an instruction to edit (reduce) the display sizes of the stream information $JS_1$ to $JS_n$ to 160 dots in width times 120 dots in length, for example. Accordingly, the respective stream servers $10_1$ to $10_n$ simultaneously receive the instruction to start the editing. Further, the transit control section 24 dispatches this instruction by taking into consideration the traffic volume of the network N and the processing capacity of the clients $30_1$ to $30_m$.

When the instruction to start the edit distribution has been dispatched, the respective distribution control sections of the stream servers $10_1$ to $10_n$ make a decision as "Yes" at the step SV1, and then proceed to a step SV2. At the step SV2, the respective distribution control sections of the stream servers $10_1$ to $10_n$ edit the display sizes of the stream information $JS_1$ to $JS_n$ to 160 dots in width times 120 dots in length, for example. Next, the respective distribution control sections of the stream servers $10_1$ to $10_n$ start transmitting the edit stream information to the multicast address, and then proceed to a step SV3. At the step SV3, the respective distribution control sections of the stream servers $10_1$ to $10_n$ make a decision as to whether or not there is an instruction to end the distribution of the edit stream information from the transit control server 20. In this case, a decision is made as "No", and the same process of decision making is repeated.

On the other hand, at the step SW2, the transit control section 24 of the transit control server 20 dispatches a reception/reproduction instruction to the clients $30_1$ to $30_m$, based on the client information $J_2$ (see FIG. 4B) read from the memory device 21, and then proceeds to the step SW3. In this case, the transit control section 24 dispatches this instruction by taking into consideration the processing capacity of the clients $30_1$ to $30_m$.

The reception/reproduction instruction in this case is the instruction to receive from the stream servers $10_1$ to $10_4$ (not shown) four edit stream information, for example, from out of a plurality of edit stream information transmitted to the multicast address based on the server information $J_1$, and to reproduce in real time the four received edit stream information. At the step SW3, the transit control section 24 makes a decision as to whether or not there is an instruction from the distributor to end the distribution. In this case, a decision is made as "No", and the same process of decision making is repeated.

Upon receiving the reception/reproduction instruction, the respective reception control sections of the clients $30_1$ to $30_m$ make a decision as "Yes" at the step SX1, and then proceed to a step SX2. At the step SX2, the respective reception control sections of the clients $30_1$ to $30_m$ start the reception of the four edit stream information distributed from the stream servers $10_1$ to $10_4$ (not shown). After starting the real-time reproduction of the four edit stream information, the respective reception control sections of the clients $30_1$ to $30_m$ proceed to a step SX3. With this arrangement, the display devices $32_1$ to $32_m$ reproduce in real time the compressed four contents (the moving picture) within one frame, and also reproduce in real time the voice relating to the four contents.

At the step SX3, the respective reception control sections of the clients $30_1$ to $30_m$ make a decision as to whether or not there is an instruction to end the reception/reproduction. In this case, the respective reception control sections of the clients $30_1$ to $30_m$ make a decision as "No", and repeat the same process of decision making. When the end instruction has been dispatched, the transit control section 24 of the transit control server 20 shown in FIG. 3 makes a decision as "Yes" at the step SW3, and then proceeds to a step SW4. At the step SW4, the transit control section 24 dispatches an instruction to end the reception/reproduction to the clients $30_1$ to $30_m$, and then proceeds to a step SW5. Then, the respective reception control sections of the clients $30_1$ to $30_m$ make a decision as "Yes" at the step SX3, and then proceed to a step SX4. Thus, the reception and the real-time reproduction of the edit stream information is stopped.

Further, at the step SW5, the transit control section 24 dispatches to the stream servers $10_1$ to $10_n$ by simultaneous multi-address calling an instruction to end the distribution relating to the edit stream information. Thus, the respective distribution control sections of the stream servers $10_1$ to $10_n$ simultaneously receive the instruction to end the distribution, and make a decision as "Yes" at the step SV3. Then, the respective distribution control sections of the stream servers $10_1$ to $10_n$ proceed to a step SV4, and end the distribution of the edit stream information.

As explained above, according to the eighth embodiment of the invention, the edited stream information is distributed to the clients $30_1$ to $30_m$ from the stream servers $10_1$ to $10_n$ by the control of the transit control section 24. Therefore, as compared with the case of distributing the stream information to the clients $30_1$ to $30_m$, it is possible to decrease the traffic volume of the network N.

In the first embodiment, there has not particularly been explained a display control and the like at the time of real-time reproducing in the display devices $32_1$ to $32_m$ at the side of the clients $30_1$ to $30_m$. However, it is also possible to carry out the display control and the like by using client control information $J_4$ shown in FIG. 16. This case will be explained below as a ninth embodiment. The hardware configuration of the ninth embodiment is the same as the hardware configuration of the first embodiment. However, in the case of the ninth embodiment, the function of the transit control server 20 shown in FIG. 1 is different from that of the first embodiment as described later.

In the ninth embodiment, the client control information $J_4$ shown in FIG. 16 is stored in the memory device 21 shown in FIG. 1. This client control information $J_4$ is the information for carrying out the display control of the clients $30_1$ to $30_m$ respectively. The client control information $J_4$ is composed of "server name", "server IP (Internet Protocol address)", "multicast address", "contents name", "image" and others. The "server name", the "server IP (Internet Protocol address)", the "contents name" and the "multicast address" are the same information as those of the server information $J_1$ shown in FIG. 4A respectively.

The "image" is the information for controlling the decision about whether or not the image (moving picture) obtained from the stream information $JS_1$ to $JS_n$ is to be displayed in the display devices $32_1$ to $32_m$. "Display size" is the information for controlling the display size (for example, 320 dots times 240 dots) of the moving picture in the display devices $32_1$ to $32_m$. "Voice" is the information for controlling the decision about whether or not the voice or sound from the stream information $JS_1$ to $JS_n$ is to be reproduced. "Reproduction speed" is the information for controlling the speed of real-time reproducing the stream information $JS_1$ to $JS_n$.

"Sound volume" is the information for controlling the sound volume at the time of reproducing the voice or sound from the stream information $JS_1$ to $JS_n$. "Reproduction status display" is the information for controlling the decision about whether or not the reproduction status about the presence or absence of the real-time reproduction of the stream information $JS_1$ to $JS_n$, is to be displayed in the display devices $32_1$ to $32_m$. "Title" is the information on the respective names of the "contents 1" to the "contents n". "Reproduction time display" is the information for controlling the decision about whether or not the time required for the real-time reproduction is displayed in the display devices $32_1$ to $32_m$. "Display of the link status of the moving picture file and the voice file" is the information for controlling the decision about whether or not the status of linkage between the moving picture file and the voice file obtained from the stream information $JS_1$ to $JS_n$, respectively, is to be displayed in the display devices $32_1$ to $32_m$.

Figure 15:
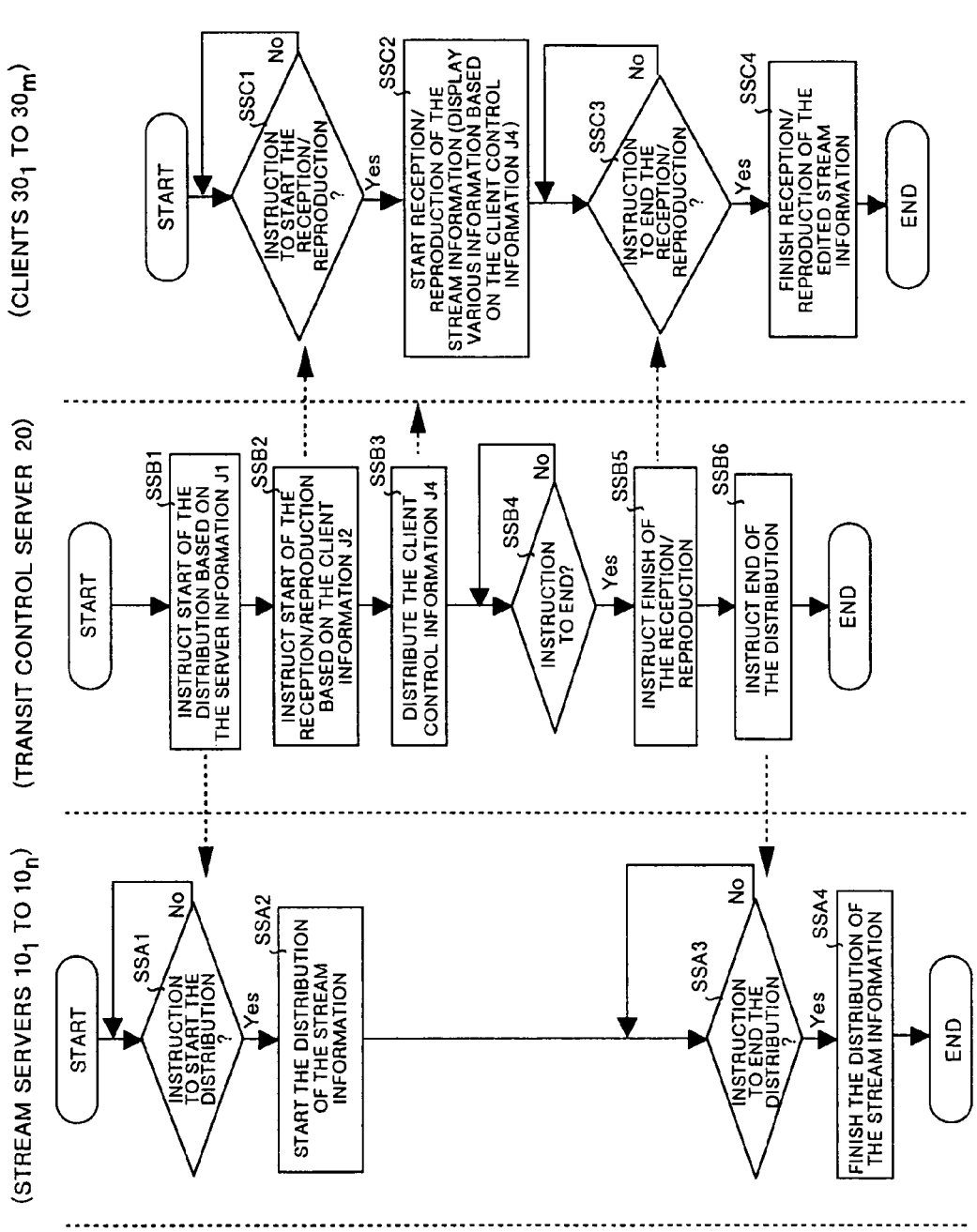
FIG. 15 is a flowchart explaining the operation of a ninth embodiment according to the present invention.

Next, the operation of the ninth embodiment will be explained with reference to a flowchart shown in FIG. 15. When the operations of the stream servers $10_1$ to $10_n$ and the clients $30_1$ to $30_m$ in FIG. 1 have been started respectively, these stream servers and clients proceed to a step SSA1 and a step SSC1 shown in FIG. 15 respectively. At the step SSA1, the distribution control sections of the respective stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated. Similarly, at the step SSC1, the respective reception control sections of the clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input, the transit control section 24 (see FIG. 3) of the transit control server 20 proceeds to a step SSB1. At the step SSB1, the transit control section 24 recognizes from the server information $J_1$ (see FIG. 4A) read from the memory device 21, the "stream servers" (the stream servers $10_1$ to $10_n$) as the origins of the distribution of the respective stream information $JS_1$ to $JS_n$. Further, the transit control section 24 recognizes the multicast address of the respective distribution destinations of the stream information $JS_1$ to $JS_n$ from the server information $J_1$. Next, the transit control section 24 instructs the stream servers $10_1$ to $10_n$ corresponding to the respective stream information $JS_1$ to $JS_n$ to distribute these information, and then proceeds to a step SSB2. In this case, the transit control section 24 dispatches the distribution instruction by taking into consideration the traffic volume of the network N and the processing capacity of the clients $30_1$ to $30_m$.

Thus, the distribution control sections of the respective stream servers $10_1$ to $10_n$ shown in FIG. 1 make a decision as "Yes" at the step SSA1, and then proceed to the next step SSA2. At the step SSA2, the distribution control sections of the respective stream servers $10_1$ to $10_n$ start the distribution of the stream information $JS_1$ to $JS_n$, and then proceed to a step SSA3. At the step SSA3, the distribution control sections of the respective stream servers $10_1$ to $10_n$ make a decision as to whether or not there is an instruction to end the distribution from the transit control server 20. In this case, a decision is made as "No", and the same process of decision making is repeated.

On the other hand, at the step SSB2, the transit control section 24 shown in FIG. 3 dispatches a reception/reproduction instruction to the clients $30_1$ to $30_m$, based on the client information $J_2$ (see FIG. 4B) read from the memory device 21, and then proceeds to a step SSB3. In this case, the transit control section 24 dispatches the reception/reproduction instruction by taking into consideration the processing capacity of the clients $30_1$ to $30_m$. The reception/reproduction instruction in this case is the instruction to receive the stream information $JS_1$ and $JS_2$ (not shown), and to reproduce in real time the received stream information $JS_1$ and $JS_2$.

At the step SSB3, the transit control section 24 reads the client control information $J_4$ shown in FIG. 16 from the memory device 21, distributes this information to the clients $30_1$ to $30_m$, and then proceeds to a step SSB4. In the ninth embodiment, the contents of the display control and the like may be instructed to the clients $30_1$ to $30_m$ based on the client control information $J_4$ at the step SSB2, without distributing the client control information $J_4$. At the step SSB4, the transit control section 24 makes a decision as to whether or not there is an instruction to end the distribution. In this case, a decision is made as "No", and the same process of decision making is repeated.

Upon receiving the reception/reproduction instruction, the respective reception control sections of the clients $30_1$ to $30_m$ make a decision as "Yes" at the step SSC1, and then proceed to a step SSC2. At the step SSC2, the respective reception control sections of the clients $30_1$ to $30_m$ receive the client control information $J_4$ (see FIG. 16), and then start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, and then proceed to a step SSC3. Thus, the display devices $32_1$ to $32_m$ reproduce in real time the moving picture and voice relating to the "contents 1" and the "contents 2" respectively. In this case, the respective reception control sections carry out the display control and the like based on the client control information $J_4$. For example, when the stream information $JS_1$ is being reproduced in real time, the "display size" of the moving picture is 320 dots times 240 dots, the "reproduction speed" is the normal speed, and the "sound volume" is small, based on the client control information $JS_1$.

At the step SSC3, the respective reception control sections of the clients $30_1$ to $30_m$ make a decision as to whether or not there is an instruction to end the reception/reproduction from the transit control server 20. In this case, a decision is made as "No", and the same process of decision making is repeated. When the end instruction has been dispatched, the transit control section 24 of the transit control server 20 shown in FIG. 3 makes a decision as "Yes" at the step SSB4, and then proceeds to a step SSB5. At the step SSB5, the transit control section 24 dispatches an instruction to end the reception/reproduction to the clients $30_1$ to $30_m$, and then proceeds to a step SSB6. Then, the respective reception control sections of the clients $30_1$ to $30_m$ make a decision as "Yes" at the step SSC3, and then proceed to a step SSC4. Thus, the reception and the real-time reproduction of the stream information $JS_1$ and $JS_2$ is stopped.

Further, at the step SSB6, the transit control section 24 dispatches an instruction to end the distribution, to the stream servers $10_1$ to $10_n$. Thus, the respective distribution control sections of the stream servers $10_1$ to $10_n$ make a decision as "Yes" at the step SSA3, and then proceed to a step SSA4. At the step SSA4, the respective distribution control sections of the stream servers $10_1$ to $10_n$ end the distribution of the stream information $JS_1$ to $JS_n$.

As explained above, according to the ninth embodiment of the invention, the distribution, the method of displaying the moving picture and the method of outputting the voice are all controlled by the transit control section 24. Therefore, it is possible to carry out a real-time reproduction of the stream information based on the proper distribution of the stream information, proper method of displaying the moving picture and proper method of outputting the voice. Further, it is also possible to provide the information distribution service with high added value.

In the first embodiment, there has not particularly been explained in detail the real-time reproduction in the display devices $32_1$ to $32_m$ at the side of the clients $30_1$ to $30_m$. However, it is also possible to carry out the control of the real-time reproduction and the like by using stream reproduction information $J_5$ shown in FIG. 18. This case will be explained below as a tenth embodiment. The hardware configuration of the tenth embodiment is the same as the hardware configuration of the first embodiment. However, in the case of the tenth embodiment, the function of the transit control server 20 shown in FIG. 1 is different from that of the first embodiment as described later.

In the tenth embodiment, the stream reproduction information $J_5$ shown in FIG. 18 is stored in the memory device 21 shown in FIG. 1. This stream reproduction information $J_5$ is the information for carrying out the control of the real-time reproduction at the clients $30_1$ to $30_m$ respectively. The stream reproduction information $J_5$ is composed of "first stream information", "second stream information", "image superimposition" and "voice reproduction method". The "first stream information" is the information on one of the real-time information (for example, the stream information $JS_1$) to be reproduced in real time. In an example shown in this drawing, the "first stream information" includes "server name" defined as the "stream server 1" (stream server $10_1$), and "contents name" defined as the "contents 1".

Similarly, the "second stream information" is the information on the other real-time information (for example, the stream information $JS_2$) to be reproduced in real time. In the example shown in this drawing, the "second stream information" includes "server name" defined as the "stream server 2" (stream server $10_2$), and "contents name" defined as the "contents 2". The "image superimposition" is the information for controlling the decision about whether or not the real-time-reproduced moving picture (image) of the "contents 1" and the moving picture (image) of the "contents 2" are to be displayed in superimposition. "Voice synthesis" is the information for controlling the decision about whether or not the real-time-reproduced voice of the "contents 1" and the voice of the "contents 2" are to be output by synthesizing both voices.

Figure 17:
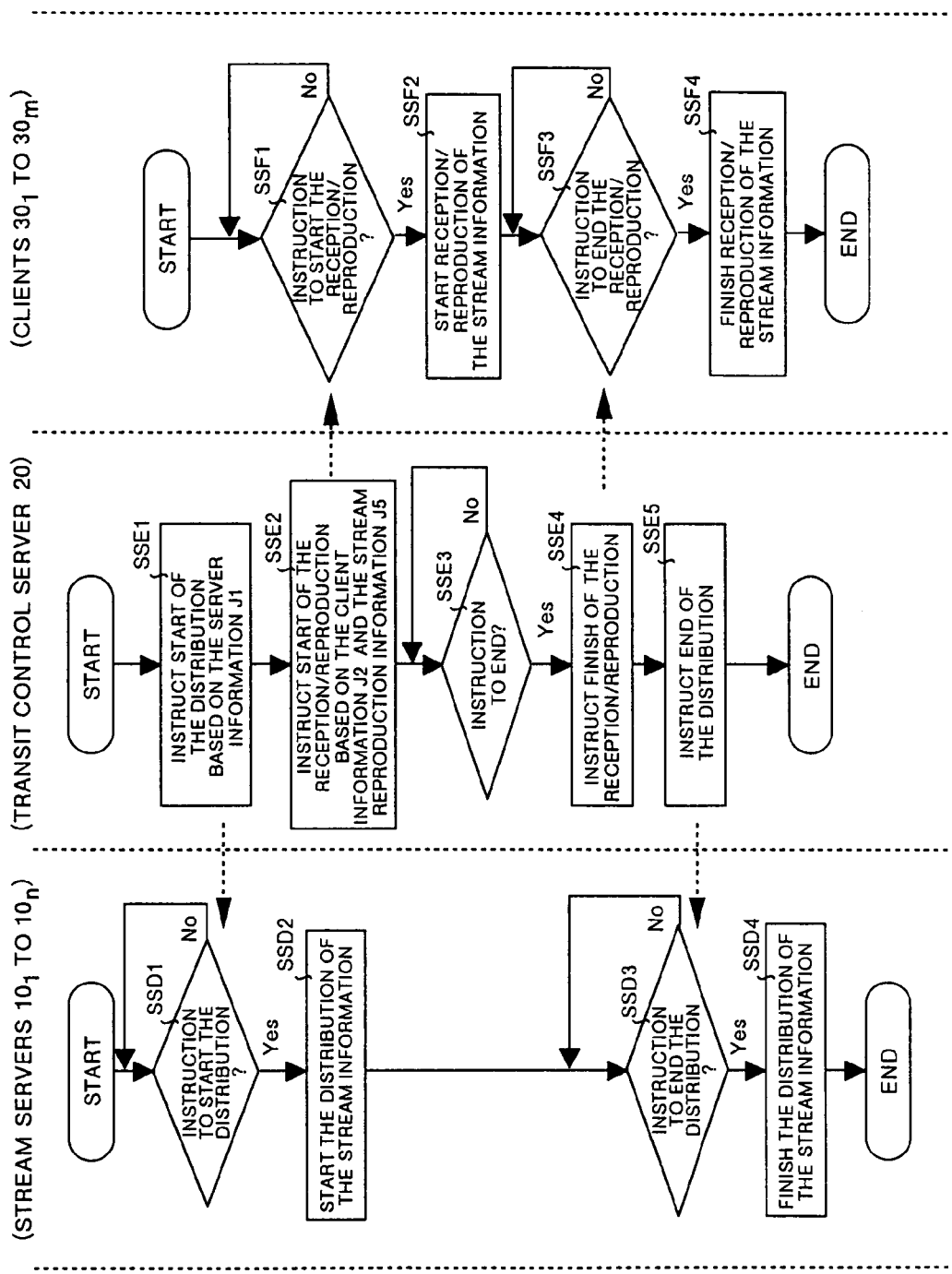
FIG. 17 is a flowchart explaining the operation of a tenth embodiment according to the present invention.

Next, the operation of the tenth embodiment will be explained with reference to a flowchart shown in FIG. 17. When the operations of the stream servers $10_1$ to $10_1$ and the clients $30_1$ to $30_m$ in FIG. 1 have been started respectively, these stream servers and clients proceed to a step SSD1 and a step SSF1 shown in FIG. 17 respectively. At the step SSD1, the distribution control sections of the respective stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated. Similarly, at the step SSF1, the respective reception control sections of the clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input, the transit control section 24 (see FIG. 3) of the transit control server 20 proceeds to a step SSE1. At the step SSE1, the transit control section 24 recognizes from the server information $J_1$ (see FIG. 4A) read from the memory device 21, the "stream servers" (the stream servers $10_1$ to $10_n$) as the origins of the distribution of the respective stream information $JS_1$ to $JS_n$. Further, the transit control section 24 recognizes the multicast address of the respective distribution destinations of the stream information $JS_1$ to $JS_n$ from the server information $J_1$. Next, the transit control section 24 instructs the stream servers $10_1$ to $10_n$ corresponding to the respective stream information $JS_1$ to $JS_n$ to distribute these information, and then proceeds to a step SSE2. In this case, the transit control section 24 dispatches the distribution instruction by taking into consideration the traffic volume of the network N and the processing capacity of the clients $30_1$ to $30_m$.

Thus, the distribution control sections of the respective stream servers $10_1$ to $10_n$ shown in FIG. 1 make a decision as "Yes" at the step SSD1, and then proceed to the next step SSD2. At the step SSD2, the distribution control sections of the respective stream servers $10_1$ to $10_n$ start the distribution of the stream information $JS_1$ to $JS_n$, and then proceed to a step SSD3. At the step SSD3, the distribution control sections of the respective stream servers $10_1$ to $10_n$ make a decision as to whether or not there is an instruction to end the distribution from the transit control server 20. In this case, a decision is made as "No", and the same process of decision making is repeated.

On the other hand, at the step SSE2, the transit control section 24 shown in FIG. 3 dispatches a reception/reproduction instruction to the clients $30_1$ to $30_m$, based on the client information $J_5$ (see FIG. 18) read from the memory device 21, and then proceeds to a step SSE3. In this case, the transit control section 24 dispatches the reception/reproduction instruction by taking into consideration the processing capacity of the clients $30_1$ to $30_m$. The reception/reproduction instruction in this case is the instruction to receive the stream information $JS_1$ and $JS_2$ (not shown), and to reproduce in real time the received stream information $JS_1$ and $JS_2$.

In addition, the reception/reproduction instruction is the instruction to display in parallel, without superimposition, the contents 1 (moving picture) corresponding to the stream information $JS_1$ and the contents 2 (moving picture) corresponding to the stream information $JS_2$ during the real-time reproduction, and to output the contents 1 (voice) corresponding to the stream information $JS_1$ and the contents 2 (voice) corresponding to the stream information $JS_2$ by synthesizing them together during the real-time reproduction. In the tenth embodiment, it may be arranged such that the stream reproduction information $J_5$ is distributed to the clients $30_1$ to $30_m$, and the stream reproduction is controlled at the side of the clients $30_1$ to $30_m$ based on the stream reproduction information $J_5$.

Upon receiving the reception/reproduction instruction, the respective reception control sections of the clients $30_1$ to $30_m$ make a decision as "Yes" at the step SSF1, and then proceed to a step SSF2. At the step SSF2, the respective reception control sections of the clients $30_1$ to $30_m$ start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, and then proceed to a step SSF3. Thus, the display devices $32_1$ to $32_m$ reproduce in real time the moving picture and voice relating to the "contents 1" and the "contents 2" respectively. In this case, the respective reception control sections make the "contents 1" (moving picture) corresponding to the stream information $JS_1$ and the "contents 2" (moving picture) corresponding to the stream information $JS_2$ to be displayed in parallel, without superimposition, and make the "contents 1" (voice) and the "contents 2" (voice) to be synthesized together, based on the reproduction instruction from the transit control server 20.

At the step SSF3, the respective reception control sections of the clients $30_1$ to $30_m$ make a decision as to whether or not there is an instruction to end the reception/reproduction from the transit control server 20. In this case, a decision is made as "No", and the same process of decision making is repeated. When the end instruction has been dispatched, the transit control section 24 of the transit control server 20 shown in FIG. 3 makes a decision as "Yes" at the step SSE3, and then proceeds to a step SSE4. At the step SSE4, the transit control section 24 dispatches an instruction to end the reception/reproduction to the clients $30_1$ to $30_m$, and then proceeds to a step SSE5. Then, the respective reception control sections of the clients $30_1$ to $30_m$ make a decision as "Yes" at the step SSF3, and then proceed to a step SSF4. Thus, the reception and the real-time reproduction of the stream information $JS_1$ and $JS_2$ is stopped.

Further, at the step SSE5, the transit control section 24 dispatches an instruction to end the distribution, to the stream servers $10_1$ to $10_n$. Thus, the respective distribution control sections of the stream servers $10_1$ to $10_n$ make a decision as "Yes" at the step SSD3, and then proceed to a step SSD4. At the step SSD4, the respective distribution control sections of the stream servers $10_1$ to $10_n$ end the distribution of the stream information $JS_1$ to $JS_n$.

As explained above, according to the tenth embodiment of the invention, the distribution, the method of displaying the moving picture and the method of outputting the voice are all controlled by the transit control section 24. Therefore, it is possible to carry out a real-time reproduction of the stream information based on the proper distribution of the stream information, proper method of displaying the moving picture and proper method of outputting the voice. Further, it is also possible to provide the information distribution service with high added value.

In the tenth embodiment, there has been explained the case where the control of the real-time reproduction and the like are carried out by using the stream reproduction information $J_5$ shown in FIG. 18, during the real-time reproduction by the display devices $32_1$ to $32_m$ at the side of the clients $30_1$ to $30_m$. However, it is also possible to arrange such that the real-time reproduction is controlled by using stream reproduction information $J_6$ shown in FIG. 20 in addition to the stream reproduction information $J_5$. This case will be explained below as an eleventh embodiment. The hardware configuration of the eleventh embodiment is the same as the hardware configuration of the first embodiment. However, in the case of the eleventh embodiment, the function of the transit control server 20 shown in FIG. 1 is different from that of the first embodiment as described later.

In the eleventh embodiment, the stream reproduction information $J_5$ (see FIG. 18) and the stream reproduction information $J_6$ shown in FIG. 20 are stored in the memory device 21 shown in FIG. 1. This stream reproduction information $J_6$ is the information for carrying out the control of the real-time reproduction at the clients $30_1$ to $30_m$ respectively. The stream reproduction information $J_6$ is composed of "stream number", "contents name", "display information" and "voice reproduction information". The "stream number" is the information on the number of stream information to be reproduced in real time at one client. The "contents name" is the contents name(s) ("contents 1", "contents 2") corresponding to one or a plurality of stream information to be reproduced in real time at one client. In this case, the "contents 1" corresponds to the stream information $JS_1$, and the "contents 2" corresponds to the stream information $JS_2$.

The "display information" is composed of "display size" and "display layout". The "display size" is the information for controlling the display size (for example, 320 dots times 240 dots) of the moving picture in the display devices $32_1$ to $32_m$. In an example shown in the drawing, when the "stream number" is "1", the "display size" relating to the "contents 1" is defined as 640 dots times 480 dots. Further, when the "stream number" is "2", the "display size" relating to the "contents 1" and the "display size" relating to the "contents 2" are defined as 320 dots times 240 dots and 320 dots times 240 dots respectively.

The "display layout" is the information on the display position of the moving picture(s) of the "contents 1" (and the "contents 2") that are reproduced in real time. In the example shown in the drawing, when the "stream number" is "1", the moving picture of the "contents 1" is displayed on the whole screen of the display device. Further, when the "stream number" is "2", the moving picture of the "contents 1" and the moving picture of the "contents 2" are displayed on the screen of the display device in such a manner that the two moving pictures are laid out in parallel in the lateral direction.

Further, the "voice reproduction information" is composed of "sound volume allocation" and "time allocation". The "sound volume allocation" is the information for controlling the distribution of the sound volume of the "contents 1" and the sound volume of the "contents 2". In the example shown in the drawing, when the "stream number" is "1", the sound volume allocation to the contents 1 is 100%. On the other hand, when the "stream number" is "2", the sound volume allocation to the contents 2 is 0% while the sound volume allocation to the contents 1 is 100%.

The "time allocation" is the information for controlling the distribution of the time of the "contents 1" and the time of the "contents 2". In the example shown in the drawing, when the "stream number" is "1", the time allocation to the contents 1 is 100%. On the other hand, when the "stream number" is "2", the time allocation to the "contents 2" is 0% while the time allocation to the "contents 1" is 100%.

Figure 19:
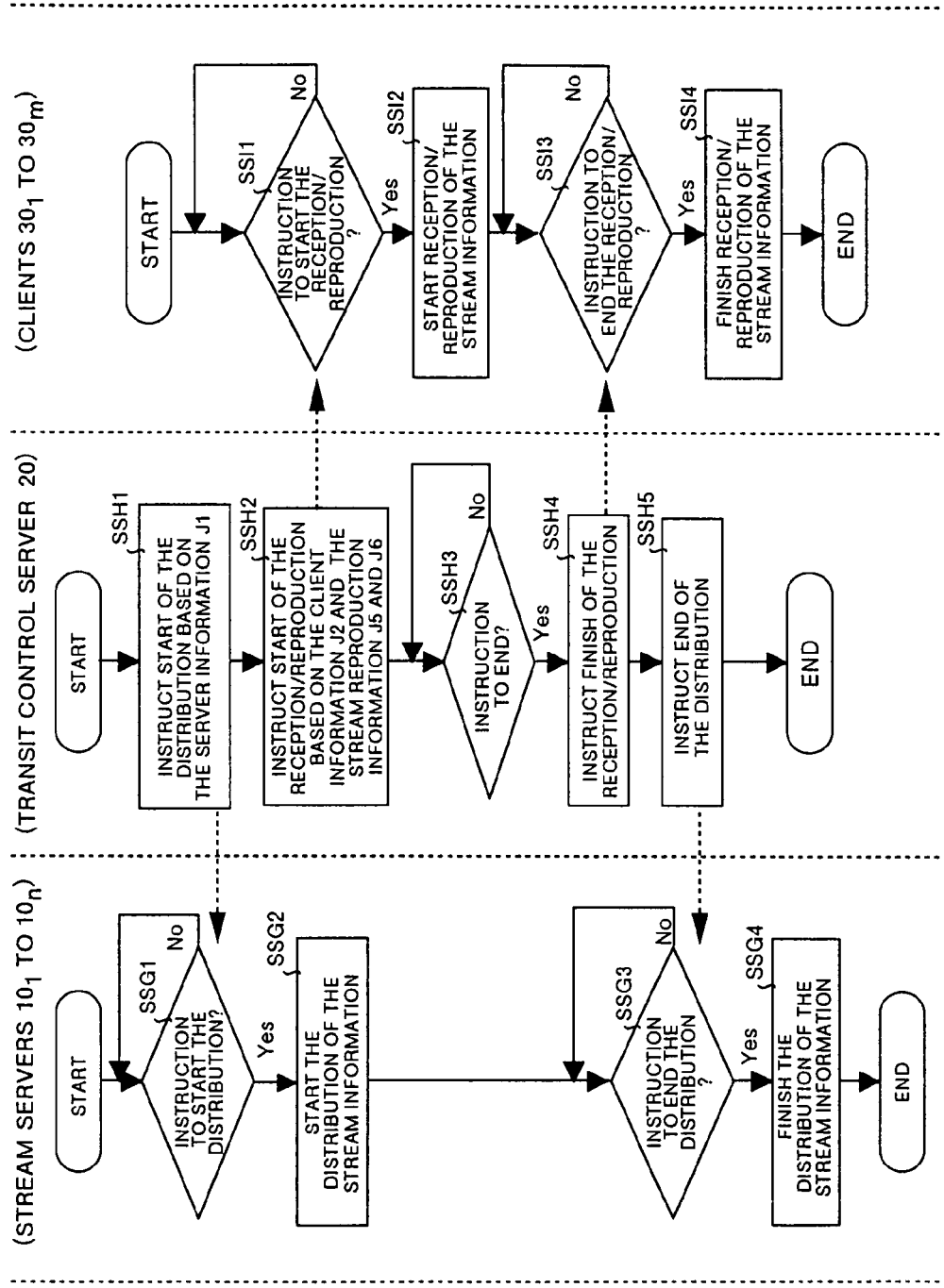
FIG. 19 is a flowchart explaining the operation of an eleventh embodiment according to the present invention.

Next, the operation of the eleventh embodiment will be explained with reference to a flowchart shown in FIG. 19. When the operations of the stream servers $10_1$ to $10_n$ and the clients $30_1$ to $30_m$ in FIG. 1 have been started respectively, these stream servers and clients proceed to a step SSG1 and a step SSI1 shown in FIG. 19 respectively. At the step SSG1, the distribution control sections of the respective stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated. Similarly, at the step SSI1, the respective reception control sections of the clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input, the transit control section 24 (see FIG. 3) of the transit control server 20 proceeds to a step SSH1. At the step SSH1, the transit control section 24 recognizes from the server information $J_1$ (see FIG. 4A) read from the memory device 21, the "stream servers" (the stream servers $10_1$ to $10_n$) as the origins of the distribution of the respective stream information $JS_1$ to $JS_n$. Further, the transit control section 24 recognizes the multicast address of the respective distribution destinations of the stream information $JS_1$ to $JS_n$ from the server information $J_1$. Next, based on this recognition, the transit control section 24 instructs the stream servers $10_1$ to $10_n$ corresponding to the respective stream information $JS_1$ to $JS_n$ to distribute these information, and then proceeds to a step SSH2. In this case, the transit control section 24 dispatches the distribution instruction by taking into consideration the traffic volume of the network N and the processing capacity of the clients $30_1$ to $30_m$.

Thus, the distribution control sections of the respective stream servers $10_1$ to $10_n$ shown in FIG. 1 make a decision as "Yes" at the step SSG1, and then proceed to the next step SSG2. At the step SSG2, the distribution control sections of the respective stream servers $10_1$ to $10_n$ start the distribution of the stream information $JS_1$ to $JS_n$, and then proceed to a step SSG3. At the step SSG3, the distribution control sections of the respective stream servers $10_1$ to $10_n$ make a decision as to whether or not there is an instruction to end the distribution from the transit control server 20. In this case, a decision is made as "No", and the same process of decision making is repeated.

On the other hand, at the step SSH2, the transit control section 24 shown in FIG. 3 dispatches a reception/reproduction instruction to the clients $30_1$ to $30_m$, based on the client information $J_5$ (see FIG. 18) and the stream reproduction information $J_6$ (see FIG. 20) read from the memory device 21, and then proceeds to a step SSH3. In this case, the transit control section 24 dispatches the reception/reproduction instruction by taking into consideration the processing capacity of the clients $30_1$ to $30_m$.

However, when there arises a contradiction between the instruction based on the stream reproduction information $J_5$ and the instruction based on the stream reproduction information $J_6$, the transit control section 24 dispatches the instruction based on only the stream reproduction information $J_6$, without dispatching the instruction based on the stream reproduction information $J_5$. Similarly, when the "stream number" of the stream reproduction information $J_6$ is "1", the transit control section 24 dispatches the instruction based on only the stream reproduction information $J_6$.

The reception/reproduction instruction in this case is the instruction to receive the stream information $JS_1$ and $JS_2$ (not shown), and to reproduce in real time the received stream information $JS_1$ and $JS_2$. In this case, there arises a contradiction between the instruction based on the stream reproduction information $J_5$ and the instruction based on the stream reproduction information $J_6$ on the "voice reproduction method" and the "voice reproduction information". Therefore, the transit control section 24 dispatches the instruction based on only the stream reproduction information $J_6$.

That is, the reception/reproduction instruction includes the instruction to set the display sizes of the moving picture of the "contents 1" and the moving picture of the "contents 2" to 320 dots times 240 dots and 320 dots times 240 dots respectively, the instruction to display the moving picture of the "contents 1" and the moving picture of the "contents 2" in parallel in the lateral direction, and the instruction to set the sound volume allocation and the time allocation between the "contents 1" and the "contents 2" to 100%:0% respectively, based on the stream reproduction information $J_6$ (the "number of stream(s)="2") shown in FIG. 20.

In the eleventh embodiment, it may be arranged such that the stream reproduction information $J_5$ and stream reproduction information $J_6$ are distributed to the clients $30_1$ to $30_m$, and the stream reproduction is controlled at the side of the clients $30_1$ to $30_m$ based on the stream reproduction information $J_5$ and the stream reproduction information $J_6$.

Upon receiving the reception/reproduction instruction, the respective reception control sections of the clients $30_1$ to $30_m$ make a decision as "Yes" at the step SSI1, and then proceed to a step SSI2. At the step SSI2, the respective reception control sections of the clients $30_1$ to $30_m$ start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, and then proceed to a step SSI3. Thus, the display devices $32_1$ to $32_m$ reproduce in real time the moving picture and voice relating to the "contents 1" and the "contents 2" respectively. In this case, the respective reception control sections make the "contents 1" (moving picture) corresponding to the stream information $JS_1$ and the "contents 2" (moving picture) corresponding to the stream information $JS_2$ to be displayed in the instructed display size (320 dots times 240 dots), based on the reproduction instruction from the transit control server 20. In addition, the respective reception control sections set the sound volume allocation and the time allocation between the "contents 1" and the "contents 2" to 100%:0%.

At the step SSI3, the respective reception control sections of the clients $30_1$ to $30_m$ make a decision as to whether or not there is an instruction to end the reception/reproduction from the transit control server 20. In this case, a decision is made as "No", and the same process of decision making is repeated. When the end instruction has been dispatched, the transit control section 24 of the transit control server 20 shown in FIG. 3 makes a decision as "Yes" at the step SSH3, and then proceeds to a step SSH4. At the step SSH4, the transit control section 24 dispatches an instruction to end the reception/reproduction to the clients $30_1$ to $30_m$, and then proceeds to a step SSH5. Then, the respective reception control sections of the clients $30_1$ to $30_m$ make a decision as "Yes" at the step SSI3, and then proceed to a step SSI4. Thus, the reception and the real-time reproduction of the stream information $JS_1$ and $JS_2$ is stopped.

Further, at the step SSH5, the transit control section 24 dispatches an instruction to end the distribution, to the stream servers $10_1$ to $10_n$. Thus, the respective distribution control sections of the stream servers $10_1$ to $10_n$ make a decision as "Yes" at the step SSG3, and then proceed to a step SSG4. At the step SSG4, the respective distribution control sections of the stream servers $10_1$ to $10_n$ end the distribution of the stream information $JS_1$ to $JS_n$.

As explained above, according to the eleventh embodiment of the invention, the distribution, the method of displaying the moving picture and the method of outputting the voice are all controlled by the transit control section 24. Therefore, it is possible to carry out a real-time reproduction of the stream information based on the proper distribution of the stream information, proper method of displaying the moving picture and proper method of outputting the voice. Further, it is also possible to provide the information distribution service with high added value.

In the tenth embodiment, there has been explained the case where the control of the real-time reproduction and the like are carried out by using the stream reproduction information $J_5$ shown in FIG. 18, during the real-time reproduction by the display devices $32_1$ to $32_m$ at the side of the clients $30_1$ to $30_m$. However, it is also possible to arrange such that the real-time reproduction is controlled by using stream reproduction information $J_7$ shown in FIG. 22 in addition to the stream reproduction information $J_5$. This case will be explained below as a twelfth embodiment. The hardware configuration of the twelfth embodiment is the same as the hardware configuration of the first embodiment. However, in the case of the twelfth embodiment, the function of the transit control server 20 shown in FIG. 1 is different from that of the first embodiment as described later.

In the twelfth embodiment, the stream reproduction information $J_5$ (see FIG. 18) and the stream reproduction information $J_7$ shown in FIG. 22 are stored in the memory device 21 shown in FIG. 1. This stream reproduction information $J_7$ is the information for carrying out the control of the real-time reproduction at the clients $30_1$ to $30_m$ respectively. The stream reproduction information $J_7$ is composed of "stream number", "contents name", "display information" and "voice/sound quality information". The "stream number" is the information on the number of stream information to be reproduced in real time at one client. The "contents name" is the contents name(s) ("contents 1", "contents 2") corresponding to one or a plurality of stream information to be reproduced in real time at one client. In this case, the "contents 1" corresponds to the stream information $JS_1$, and the "contents 2" corresponds to the stream information $JS_2$.

The "display information" is composed of "frame rate per stream" and "number of colors". The "frame rate per stream" is a number of frames per second (fps) of a moving picture in the display devices $32_1$ to $32_m$ at the time of real-time reproducing one stream information. In an example shown in the drawing, when the "stream number" is "1", the frame rate relating to the "contents 1" is defined as 30 (fps). Further, when the "stream number" is "2", the frame rates relating to the "contents 1" and the "contents 2" are defined as 15 (fps) and 15 (fps) respectively.

The "number of colors" is the information on the number of display colors of the "contents 1" (and the "contents 2") that are reproduced in real time. In the example shown in the drawing, when the "stream number" is "1", the "number of colors" of the "contents 1" is defined as 16 million colors. Further, when the "stream number" is "2", the "number of colors" of the "contents 1" and the "number of colors" of the "contents 2" are defined as 16 million colors respectively.

Further, the "voice/sound quality information" is the information on the sampling frequency and the number of bits when the voice data (digital data) including the stream information has been generated. In the case of the example shown in the drawing, when the "stream number" is "1", the "voice/sound quality information" of the "contents 1" is defined such that the sampling frequency is 44.1 kHz and the number of bits is 16 bits. On the other hand, when the "stream number" is "2", the "voice/sound quality information" of the "contents 1" is defined such that the sampling frequency is 22.05 kHz and the number of bits is 8 bits, but the "voice/sound quality information" of the "contents 2" is not defined (that is, "no output").

Figure 21:
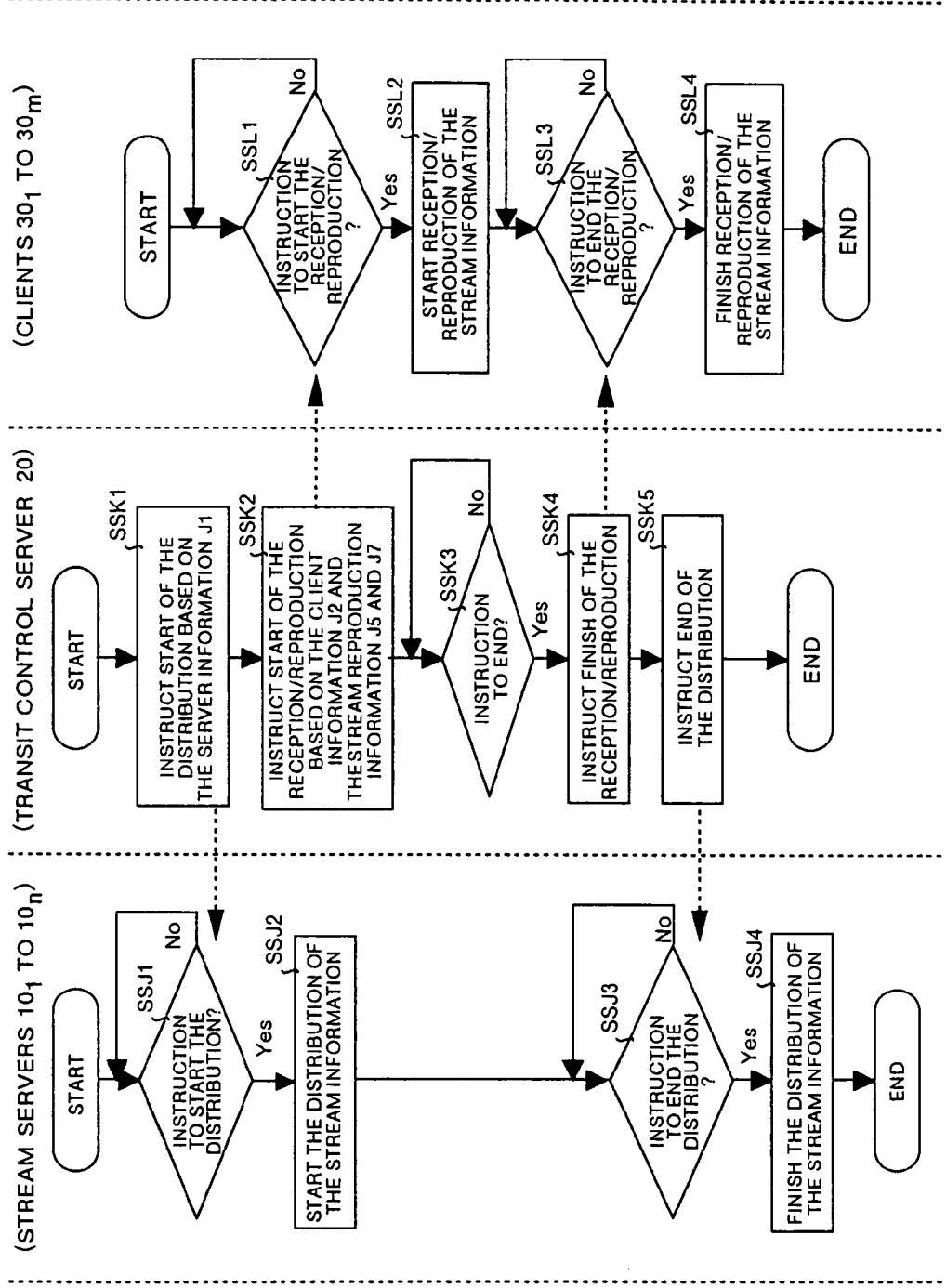
FIG. 21 is a flowchart explaining the operation of a twelfth embodiment according to the present invention.

Next, the operation of the twelfth embodiment will be explained with reference to a flowchart shown in FIG. 21. When the operations of the stream servers $10_1$ to $10_1$ and the clients $30_1$ to $30_m$ in FIG. 1 have been started respectively, these stream servers and clients proceed to a step SSJ1 and a step SSL1 shown in FIG. 21 respectively. At the step SSJ1, the distribution control sections of the respective stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated. Similarly, at the step SSL1, the respective reception control sections of the clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input, the transit control section 24 (see FIG. 3) of the transit control server 20 proceeds to a step SSK1. At the step SSK1, the transit control section 24 recognizes from the server information $J_1$ (see FIG. 4A) read from the memory device 21, the "stream servers" (the stream servers $10_1$ to $10_n$) as the origins of the distribution of the respective stream information $JS_1$ to $JS_2$. Further, the transit control section 24 recognizes the multicast address of the respective distribution destinations of the stream information $JS_1$ to $JS_2$ from the server information $J_1$. Next, based on this recognition, the transit control section 24 instructs the stream servers $10_1$ to $10_n$ corresponding to the respective stream information $JS_1$ to $JS_n$ to distribute these information, and then proceeds to a step SSK2. In this case, the transit control section 24 dispatches the distribution instruction by taking into consideration the traffic volume of the network N and the processing capacity of the clients $30_1$ to $30_m$.

Thus, the distribution control sections of the respective stream servers $10_1$ to $10_1$ shown in FIG. 1 make a decision as "Yes" at the step SSJ1, and then proceed to the next step SSJ2. At the step SSJ2, the distribution control sections of the respective stream servers $10_1$ to $10_n$ start the distribution of the stream information $JS_1$ to $JS_n$, and then proceed to a step SSJ3. At the step SSJ3, the distribution control sections of the respective stream servers $10_1$ to $10_n$ make a decision as to whether or not there is an instruction to end the distribution from the transit control server 20. In this case, a decision is made as "No", and the same process of decision making is repeated.

On the other hand, at the step SSK2, the transit control section 24 shown in FIG. 3 dispatches a reception/reproduction instruction to the clients $30_1$ to $30_m$, based on the client information $J_5$ (see FIG. 18) and the stream reproduction information $J_7$ (see FIG. 22) read from the memory device 21, and then proceeds to a step SSK3. In this case, the transit control section 24 dispatches the reception/reproduction instruction by taking into consideration the processing capacity of the clients $30_1$ to $30_m$.

The reception/reproduction instruction in this case is the instruction to receive the stream information $JS_1$ and $JS_2$ (not shown), and to reproduce in real time the received stream information $JS_1$ and $JS_2$. In addition, the reception/reproduction instruction is the instruction to display in parallel, without superimposition, the contents 1 (moving picture) corresponding to the stream information $JS_1$ and the contents 2 (moving picture) corresponding to the stream information $JS_2$ during the real-time reproduction, and to output the contents (voice) corresponding to the stream information $JS_1$ and the contents (voice) corresponding to the stream information $JS_2$ by synthesizing the contents during the real-time reproduction.

Further, the reception/reproduction instruction based on the stream reproduction information $J_7$ is the instruction to display the moving picture of the "contents 1" and the moving picture of the "contents 2" at the frame rate of 15 (fps) respectively, to set the number of colors of the "contents 1" and the number of colors of the "contents 2" to 16 million colors respectively, to display the "voice/sound quality information" relating to the "contents 1" as 22.05 kHz and 8 bits, and to make no display of the "voice/sound quality information" relating to the "contents 2".

In the twelfth embodiment, it may be arranged such that the stream reproduction information $J_5$ and stream reproduction information $J_7$ are distributed to the clients $30_1$ to $30_m$, and the stream reproduction is controlled at the side of the clients $30_1$ to $30_m$ based on the stream reproduction information $J_5$ and the stream reproduction information $J_7$.

Upon receiving the reception/reproduction instruction, the respective reception control sections of the clients $30_1$ to $30_m$ make a decision as "Yes" at the step SSL1, and then proceed to a step SSL2. At the step SSL2, the respective reception control sections of the clients $30_1$ to $30_m$ start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, and then proceed to a step SSL3. Thus, the display devices $32_1$ to $32_m$ reproduce in real time the moving picture and voice relating to the "contents 1" and the "contents 2" respectively. In this case, the respective reception control sections make the "contents 1" (moving picture) corresponding to the stream information $JS_1$ and the "contents 2" (moving picture) corresponding to the stream information $JS_2$ to be displayed based on the instructed frame rate and the instructed number of colors, according to the reproduction instruction from the transit control server 20. In addition, the respective reception control sections make the "voice/sound quality information" of the "contents 1" to be displayed.

At the step SSL3, the respective reception control sections of the clients $30_1$ to $30_m$ make a decision as to whether or not there is an instruction to end the reception/reproduction from the transit control server 20. In this case, a decision is made as "No", and the same process of decision making is repeated. When the end instruction has been dispatched, the transit control section 24 of the transit control server 20 shown in FIG. 3 makes a decision as "Yes" at the step SSK3, and then proceeds to a step SSK4. At the step SSK4, the transit control section 24 dispatches an instruction to end the reception/reproduction to the clients $30_1$ to $30_m$, and then proceeds to a step SSK5. Then, the respective reception control sections of the clients $30_1$ to $30_m$ make a decision as "Yes" at the step SSL3, and then proceed to a step SSL4. Thus, the reception and the real-time reproduction of the stream information $JS_1$ and $JS_2$ is stopped.

Further, at the step SSK5, the transit control section 24 dispatches an instruction to end the distribution, to the stream servers $10_1$ to $10_n$. Thus, the respective distribution control sections of the stream servers $10_1$ to $10_n$ make a decision as "Yes" at the step SSJ3, and then proceed to a step SSJ4. At the step SSJ4, the respective distribution control sections of the stream servers $10_1$ to $10_n$ end the distribution of the stream information $JS_1$ to $JS_n$.

As explained above, according to the twelfth embodiment of the invention, the distribution, the method of displaying the moving picture and the method of outputting the voice are all controlled by the transit control section 24. Therefore, it is possible to carry out a real-time reproduction of the stream information based on the proper distribution of the stream information, proper method of displaying the moving picture and proper method of outputting the voice. Further, it is also possible to provide the information distribution service with high added value.

In the tenth embodiment, there has been explained the case where the control of the real-time reproduction and the like are carried out by using the stream reproduction information $J_5$ shown in FIG. 18, during the real-time reproduction by the display devices $32_1$ to $32_m$ at the side of the clients $30_1$ to $30_m$. However, it is also possible to arrange such that the real-time reproduction is controlled by using stream reproduction information $J_8$ shown in FIG. 24 in addition to the stream reproduction information $J_5$. This case will be explained below as a thirteenth embodiment. The hardware configuration of the thirteenth embodiment is the same as the hardware configuration of the first embodiment. However, in the case of the thirteenth embodiment, the function of the transit control server 20 shown in FIG. 1 is different from that of the first embodiment as described later.

In the thirteenth embodiment, the stream reproduction information $J_8$ shown in FIG. 24 is stored in the memory device 21 shown in FIG. 1. This stream reproduction information $J_8$ is the information for carrying out the control of the real-time reproduction at the clients $30_1$ to $30_m$ respectively. The stream reproduction information $J_8$ is composed of "first stream information" and "second stream information" and others.

The "first stream information" is the information on one of the real-time information (for example, the stream information $JS_1$) to be reproduced in real time. In an example shown in this drawing, the "first stream information" includes the "server name" that is defined as the "stream server 1" (the stream server $10_1$), the "contents name" that is defined as the "contents 1", and "importance level" that is defined as high.

Similarly, the "second stream information" is the information on the other real-time information (for example, the stream information $JS_2$) to be reproduced in real time. In the example shown in this drawing, the "second stream information" includes the "server name" that is defined as the "stream server 2" (the stream server $10_2$), the "contents name" that is defined as the "contents 2", and "importance level" that is defined as low.

"Reproduction information on stream information with high importance level" is the control information at the time of real-time reproducing the "first stream information" (the stream information $JS_1$) with high "importance level" described above. "Display position" is a display position ("upper row") of the "first stream information" in the display devices $32_1$ to $32_m$. "Display size" is the information for controlling the display size (640 dots times 480 dots) of the moving picture in the display devices $32_1$ to $32_m$.

"Frame rate" is the number of frames per second of the moving picture in the display devices $32_1$ to $32_m$ at the time of real-time reproducing the first stream information. In the case of the example shown in the drawing, the frame rate is defined as 30 (fps). "Number of colors" is the information on the number of display colors of the "contents 1" reproduced in realtime. This is defined as 16 million colors in this example. "Value" and "chroma" are parameters for representing psychological attributes of color respectively. In the example shown, they are both "high". "Presence or absence of voice reproduction" is the information for controlling a decision as to whether voice is to be reproduced or not from the stream information $JS_1$. In the example shown, this is defined as "with reproduction".

On the other hand, "reproduction information on stream information with low importance level" is the control information at the time of real-time reproducing the "second stream information" (the stream information $JS_2$) with low "importance level" described above. "Display position" is a display position ("lower row") of the "second stream information" in the display devices $32_1$ to $32_m$. "Display size" is the information for controlling the display size (for example, 320 dots times 240 dots) of the moving picture in the display devices $32_1$ to $32_m$.

"Frame rate" is the number of frames per second of the moving picture in the display devices $32_1$ to $32_m$ at the time of real-time reproducing the second stream information. In the case of the example shown in the drawing, the frame rate is defined as 15 (fps). "Number of colors" is the information on the number of display colors of the "contents 2" reproduced in real time. This is defined as 65 thousand colors in this example. "Value" and "chroma" are defined as "low" respectively. "Presence or absence of voice reproduction" is the information for controlling a decision as to whether voice is to be reproduced or not from the stream information $JS_2$. In the example shown, this is defined as "without reproduction".

Figure 23:
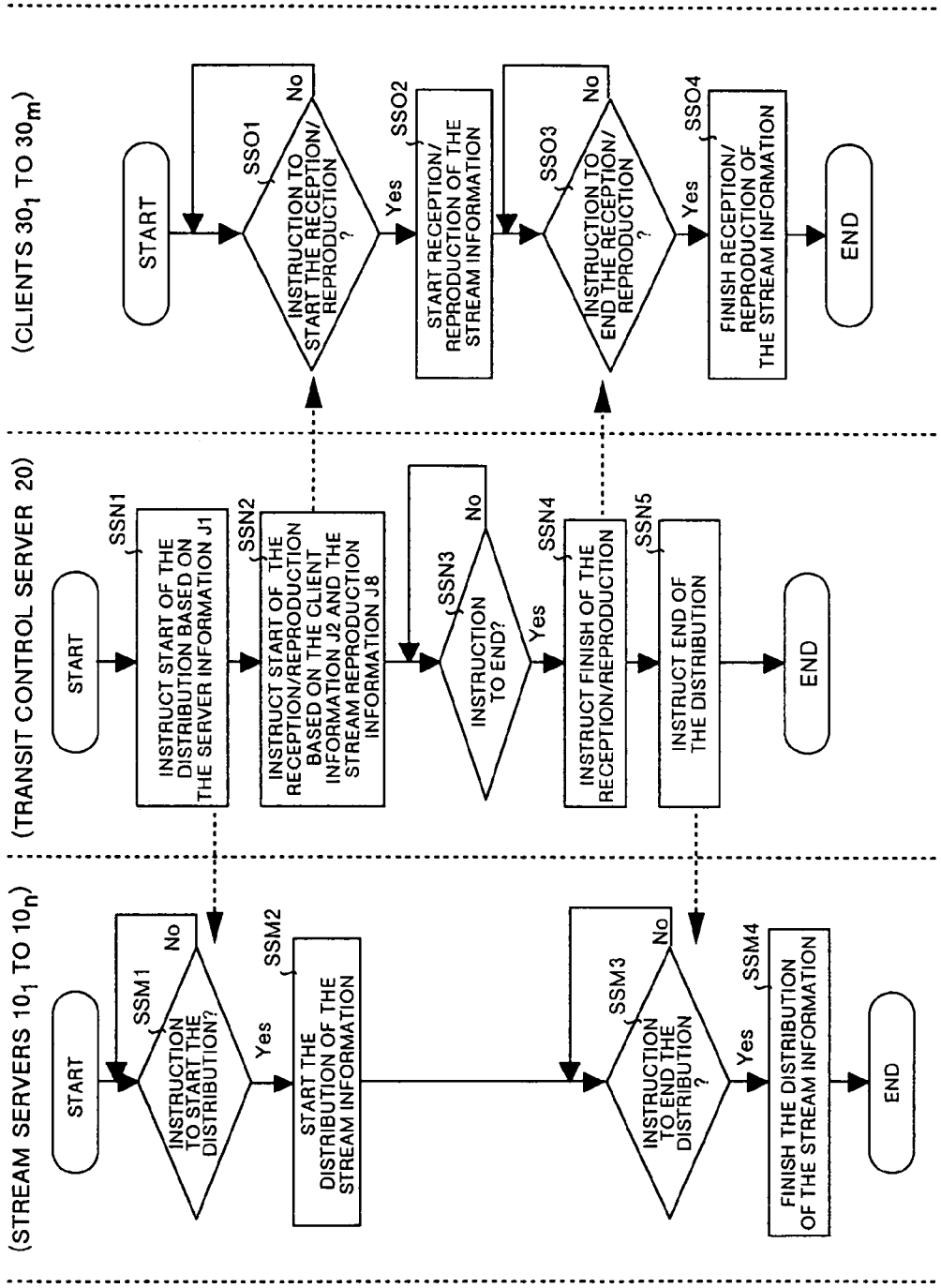
FIG. 23 is a flowchart explaining the operation of a thirteenth embodiment according to the present invention.

Next, the operation of the thirteenth embodiment will be explained with reference to a flowchart shown in FIG. 23. When the operations of the stream servers $10_1$ to $10_n$ and the clients $30_1$ to $30_m$ in FIG. 1 have been started respectively, these stream servers and clients proceed to a step SSM1 and a step SSO1 shown in FIG. 23 respectively. At the step SSM1, the distribution control sections of the respective stream servers $10_1$ to $10_n$ shown in FIG. 1 make a decision as to whether or not there is an instruction to distribute the stream information $JS_1$ to $JS_n$ respectively from the transit control server 20. In this case, a decision is made as "No", and the same process of decision making is repeated. Similarly, at the step SSO1, the respective reception control sections of the clients $30_1$ to $30_m$ make a decision as to whether or not there is a reception/reproduction instruction from the transit control server 20. In this case, a decision is made as "No", and the same process of decision making is repeated.

Then, when the information for instructing the start of distribution has been input, the transit control section 24 (see FIG. 3) of the transit control server 20 proceeds to a step SSN1. At the step SSN1, the transit control section 24 recognizes from the server information $J_1$ (see FIG. 4A) read from the memory device 21, the "stream servers" (the stream servers $10_1$ to $10_n$) as the origins of the distribution of the respective stream information $JS_1$ to $JS_n$. Further, the transit control section 24 recognizes the multicast address of the respective distribution destinations of the stream information $JS_1$ to $JS_n$ from the server information $J_1$. Next, based on this recognition, the transit control section 24 instructs the stream servers $10_1$ to $10_n$ corresponding to the respective stream information $JS_1$ to $JS_n$ to distribute these information, and then proceeds to a step SSN2. In this case, the transit control section 24 dispatches the distribution instruction by taking into consideration the traffic volume of the network N and the processing capacity of the clients $30_1$ to $30_m$.

Thus, the distribution control sections of the respective stream servers $10_1$ to $10_n$ shown in FIG. 1 make a decision as "Yes" at the step SSM1, and then proceed to the next step SSM2. At the step SSM2, the distribution control sections of the respective stream servers $10_1$ to $10_n$ start the distribution of the stream information $JS_1$ to $JS_n$, and then proceed to a step SSM3. At the step SSM3, the distribution control sections of the respective stream servers $10_1$ to $10_n$ make a decision as to whether or not there is an instruction to end the distribution from the transit control server 20. In this case, a decision is made as "No", and the same process of decision making is repeated.

On the other hand, at the step SSN2, the transit control section 24 shown in FIG. 3 dispatches a reception/reproduction instruction to the clients $30_1$ to $30_m$, based on the client information $J_2$ (see FIG. 4B) and the stream reproduction information $J_8$ (see FIG. 24) read from the memory device 21, and then proceeds to a step SSN3. In this case, the transit control section 24 dispatches the reception/reproduction instruction by taking into consideration the processing capacity of the clients $30_1$ to $30_m$.

The reception/reproduction instruction based on the stream reproduction information $J_8$ in this case is the instruction to receive the stream information $JS_1$ and $JS_2$ (not shown), and to reproduce in real time the received stream information $JS_1$ and $JS_2$. In addition, the reception/reproduction instruction is the instruction to display the moving picture of the "contents 1" in the upper row and the moving picture of the "contents 2" in the lower row respectively, and to set the display size of the "contents 1" to 640 dots times 480 dots and the display size of the "contents 2" to 320 dots times 240 dots respectively.

Further, the reception/reproduction instruction is the instruction to set the frame rate of the "contents 1" to 30 (fps) and the frame rate of the "contents 2" to 15 (fps) respectively, to set the number of colors of the "contents 1" to 16 million colors and the number of colors of the "contents 2" to 65 thousand respectively, and to set both the "value" and "chroma" of the "contents 1" to "high" respectively and set both the "value" and "chroma" of the "contents 2" to "low" respectively. Further, the reception/reproduction instruction is the instruction to reproduce the voice of the "contents 1" and to reproduce no voice of the "contents 2".

In the thirteenth embodiment, it may be arranged such that the stream reproduction information $J_8$ is distributed to the clients $30_1$ to $30_m$, and the stream reproduction is controlled at the side of the clients $30_1$ to $30_m$ based on the stream reproduction information $J_8$.

Upon receiving the reception/reproduction instruction, the respective reception control sections of the clients $30_1$ to $30_m$ make a decision as "Yes" at the step SSO1, and then proceed to a step SSO2. At the step SSO2, the respective reception control sections of the clients $30_1$ to $30_m$ start the reception of the stream information $JS_1$ and $JS_2$ designated by the transit control server 20.

Next, the respective reception control sections of the clients $30_1$ to $30_m$ start the real-time reproduction of the stream information $JS_1$ and $JS_2$, and then proceed to a step SSO3. Thus, the display devices $32_1$ to $32_m$ reproduce in real time the moving picture and voice relating to the "contents 1" and the "contents 2" respectively.

In this case, the respective reception control sections make the contents 1 (moving picture) corresponding to the stream information $JS_1$ to be displayed at the upper row and make the contents 2 (moving picture) corresponding to the stream information $JS_2$ to be displayed at the lower row based on the reproduction instruction from the transit control server 20. Further, the respective reception control sections reproduce in real time the "contents 1" and the "contents 2" based on the instruction of the stream reproduction information $J_8$ shown in FIG. 24. In other words, the "contents 1" (importance level=high) is reproduced in higher picture quality than that of the "contents 2" (importance level=low).

Further, in the display devices $32_1$ to $32_m$, the voice of the "contents 1" (importance level=high) is reproduced but the voice of the "contents 2" (importance level=low) is not reproduced. As explained above, the real-time reproduction is carries out such that the "contents 1" with higher level of importance is more noticeable than the "contents 2".

At the step SSO3, the respective reception control sections of the clients $30_1$ to $30_m$ make a decision as to whether or not there is an instruction to end the reception/reproduction from the transit control server 20. In this case, a decision is made as "No", and the same process of decision making is repeated.

When the end instruction has been dispatched, the transit control section 24 of the transit control server 20 shown in FIG. 3 makes a decision as "Yes" at the step SSN3, and then proceeds to a step SSN4. At the step SSN4, the transit control section 24 dispatches an instruction to end the reception/reproduction to the clients $30_1$ to $30_m$, and then proceeds to a step SSN5. Then, the respective reception control sections of the clients $30_1$ to $30_m$ make a decision as "Yes" at the step SSO3, and then proceed to a step SSO4. Thus, the reception and the real-time reproduction of the stream information $JS_1$ and $JS_2$ is stopped.

Further, at the step SSN5, the transit control section 24 dispatches an instruction to end the distribution, to the stream servers $10_1$ to $10_n$. Thus, the respective distribution control sections of the stream servers $10_1$ to $10_n$ make a decision as "Yes" at the step SSM3, and then proceed to a step SSM4. At the step SSM4, the respective distribution control sections of the stream servers $10_1$ to $10_n$ end the distribution of the stream information $JS_1$ to $JS_n$.

As explained above, according to the thirteenth embodiment of the invention, it is possible to reproduce in real time the stream information of high-level importance, with higher priority. Therefore, it is possible to prevent this stream information from being missed.

There have been described in detail above the first to thirteenth embodiments of the present invention with reference to the drawings. However, the detailed examples are not limited to the first to the thirteenth embodiments, and any design modifications within the scope of the present invention not deviating from the gist of the invention are all included in the present invention.

Figure 25:
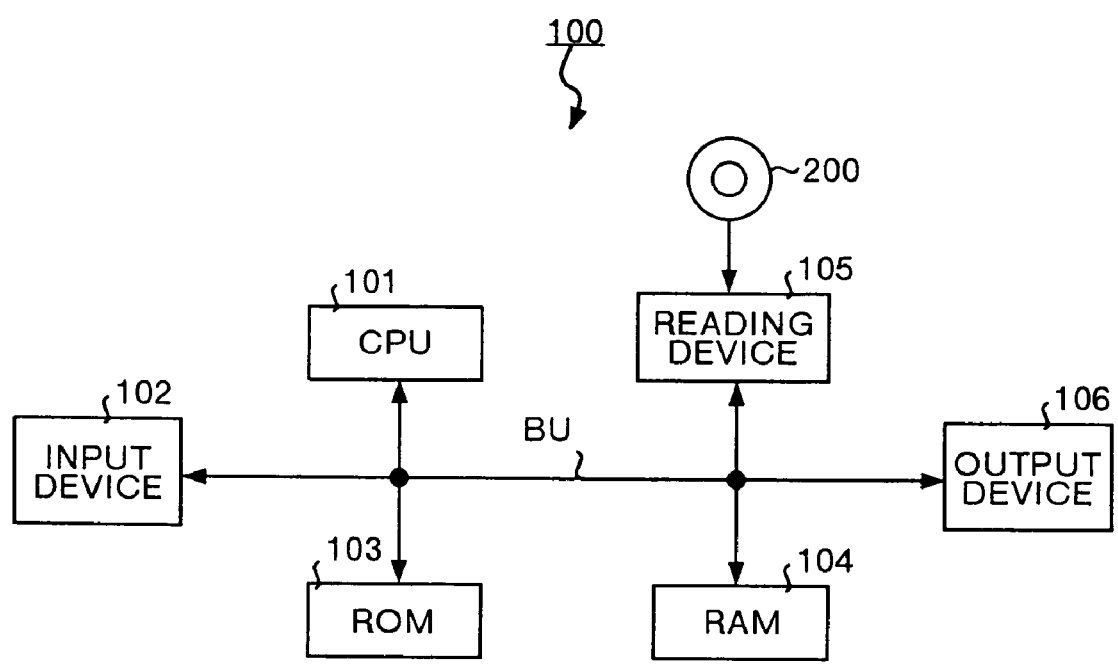
FIG. 25 is a block diagram showing a modified example of the first to thirteenth embodiments according to the present invention.

For example, in the first to thirteenth embodiments of the invention, it is also possible to arrange such that an information distribution/reproduction control program is recorded on a computer-readable recording medium shown in FIG. 25, and a computer 100 reads and executes this information distribution/reproduction control program recorded on a computer-readable recording medium 200, as shown in this drawing. In this case, the information distribution/reproduction control program is a program for achieving the function of the transit control server 20 shown in FIG. 1.

The computer 100 shown in FIG. 25 is structured by a CPU $10_1$ for executing the information distribution/reproduction control program, an input device $10_2$ such as a keyboard and a mouse, a ROM (Read Only Memory) 103 for storing various data, a RAM (Random Access Memory) 104 for storing various calculation parameters, a reading device 105 for reading the information distribution/reproduction control program from the recording medium 200, an output device 106 such as a display and a printer, and a bus BU for connecting between the devices.

The CPU $10_1$ reads the information distribution/reproduction control program recorded in the recording medium 200 through the reading device 105. Then, the CPU $10_1$ executes this information distribution/reproduction control program, thereby to carry out the distribution control and the reproduction control of the above-described stream information $JS_1$ to $JS_n$. The recording medium 200 includes not only a portable recording medium such as an optical disk, a floppy disk or a hard disk, etc. but also a transmission medium for temporarily recording and storing data such as a network.

In the first to thirteenth embodiments, a description has been made of the case where a multicast communication system is used. However, the communication system is not limited to this, and it is also possible to use any other kind of communication system that can distribute/reproduce the stream information. Therefore, in the first to thirteenth embodiments, it is also possible to use a communication system such as a broadcast system (simultaneous multi-address communication system) for simultaneously transmitting information to a plurality of unspecified clients or a unicast system (single-host transmission communication system) for transmitting information to a single client, in addition to the multicast system. Further, a construction based on a combination of two or more of the first to thirteenth embodiments is also included in the present invention.

As explained above, according to this invention, the distribution control unit carries out a distribution control and the reproduction control unit carries out a reproduction control. Therefore, there is an effect that it is possible to carry out a proper distribution and a proper real-time reproduction of the stream information. It is also possible to provide an information distribution service with high added value.

Further, the change-over unit is provided to facilitate a change-over of the control. Therefore, there is an effect that it is possible to improve the use of the apparatus.

Further, a distribution control and a control of a real-time reproduction are carried out based on the schedule information. Therefore, there is an effect that it is possible to flexibly cope with a change in the control method, by only changing the schedule information.

Further, the same control is carried out to a plurality of receiving devices, and an external control relating to a reproduction is prohibited. Therefore, there is an effect that it is possible to carry out a real-time reproduction in a status that a constant reproduction quality is maintained.

Further, an external control relating to a reproduction in the receiving devices is permitted. Therefore, there is an effect that it is possible to flexibly carry out a real-time reproduction.

According to this invention, the edit control unit controls to distribute edited stream information to the receiving device. Therefore, there is an effect that, as compared with the case of distributing the stream information to the receiving device, it is possible to decrease the traffic volume of the transmission paths of the network or the like.

According to this invention, the edit control unit controls to distribute edited stream information to the receiving device. Therefore, there is an effect that, as compared with the case of distributing the stream information to the receiving device, it is possible to decrease the traffic volume of the transmission paths of the network or the like.

According to this invention, the distribution control unit carries out a distribution control and the reproduction control unit carries out a control of the method of displaying the moving picture. Therefore, there is an effect that it is possible to carry out a real-time reproduction of the stream information based on a proper distribution of the stream information and a proper display method. Further, there is also an effect that it is possible to provide an information distribution service with high added value.

According to this invention, the distribution control unit controls a distribution and the reproduction control unit controls the method of displaying the moving picture and the method of outputting the voice. Therefore, there is an effect that it is possible to carry out a real-time reproduction of the stream information based on a proper distribution, a proper display method and a proper output method of the stream information. Further, there is also an effect that it is possible to provide an information distribution service with high added value.

Further, the stream information of higher level of importance is reproduced in real time with higher priority. Therefore, there is an effect that it is possible to prevent this important stream information from being missed.

According to this invention, the information distribution/reproduction control method can easily be realized on a computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information distribution/reproduction control apparatus in communication over a network with a distribution server and a receiving-device, comprising:
    a memory unit storing distribution server information and receiving-device information; and
    a controller
        controlling over the network according to a distribution instruction based upon the distribution server information, the distribution server distributing over the network a content as real-time reproducible stream information to the receiving device, based upon traffic volume on the network and/or processing capacity of the receiving device,
        controlling, over the network, according to a reception instruction based upon the distribution server information and the receiving device information, reception of the real-time reproducible stream information by the receiving device, based upon the traffic volume on the network and/or a processing capacity of the receiving device, and
        controlling, over the network, according to a reproduction instruction based upon the network traffic volume and/or the processing capacity of the receiving device, a display parameter of the content of the stream information to be reproduced at the receiving device, the display parameter related to one or more of a display layout comprising one or more of a display size or a display position, or a reproduction speed, or an image quality comprising one or more of a number of display colors, a lightness or a chroma, or whether to superimpose the content with another content or sound related to one or more of whether to reproduce sound, whether to synthesize a sound with another sound, specifying a sound volume, or voice/sound quality information, or prohibiting and/or permitting another external control at the receiving device of the display parameter,
    wherein the distribution instruction comprises editing the content of the real-time reproducible stream information reducing a display size of the content, based upon the traffic volume on the network and/or the processing capacity of the receiving device.

2. The information distribution/reproduction control apparatus according to claim 1, wherein the controller further changes the reproduction instruction and/or the reception instruction to the receiving device, based upon an operator input.

3. The information distribution/reproduction control apparatus according to claim 1, wherein
    the memory unit stores distribution schedule information including a time and a date to start and end the distribution of the content and the controlling of the distribution server distributing the real-time reproducible stream information is according to the distribution schedule information.

4. The information distribution/reproduction control apparatus according to claim 1,
    wherein the distribution instruction is for a plurality of said receiving devices, and said reproduction instruction carries out an identical control to each receiving device and prohibits an execution of another external control of the display parameter at each receiving device.

5. The information distribution/reproduction control apparatus according to claim 1, further comprising:
    wherein the controller further receives the real-time reproducible stream information from the distribution server, edits the real-time reproducible stream information, and transmits the real-time reproducible stream information to the receiving device.

6. The information distribution/reproduction control apparatus according to claim 1,
    wherein the distribution instruction includes distribution of a plurality of real-time reproducible stream information by a plurality of distribution servers and the memory unit stores importance level information of each content of the real-time reproducible stream information, and the reproduction instruction includes reproducing a higher priority content of stream information over contents of other stream information, based on the stored importance level information.

7. A method of controlling over a network information distribution/reproduction, comprising:
    storing distribution server information and receiving-device information;
    controlling, over the network, according to a distribution instruction based upon the distribution server information, a distribution server distributing over the network a content as real-time reproducible stream information to a receiving device, based upon traffic volume on the network and/or processing capacity of the receiving device; and
    controlling, over the network, according to a reception instruction based upon the distribution server information and the receiving device information, reception of the real-time reproducible information by the receiving device, based on the traffic volume on the network and/or the processing capacity of the receiving device; and
    controlling, over the network, according to a reproduction instruction based upon the network traffic volume and/or the processing capacity of the receiving device, a display parameter of the content of the stream information to be reproduced in controlling the realtime reproduction of the stream information of the content at the receiving device, the display parameter related to one or more of display layout comprising one or more of a display size or a display position, or a reproduction speed, or an image quality comprising one or more of a number of display colors, a lightness or a chroma, or whether to superimpose the content with another content, or sound related to one or more of whether to reproduce a sound, whether to synthesize a sound with another sound, specifying a sound volume, or voice/sound quality information, or prohibiting and/or permitting another external control at the receiving device of the display parameter,
    wherein the distribution instruction comprises editing the content of the realtime reproducible stream information reducing a display size of the content, based upon the traffic volume on the network and/or the processing capacity of the receiving device.

8. A computer-readable recording medium storing an information distribution/reproduction control program controlling a transit computer server in communication over a network with a distribution sever and a receiving device, according to operations comprising:

storing distribution server information and receiving-device information;

controlling, over the network, according to a distribution instruction based upon the distribution server information, the distribution server distributing over the network a content as real-time reproducible stream information to the receiving device, based upon traffic volume on the network and/or processing capacity of the receiving device;

controlling, over the network, according to a reception instruction based upon the distribution server information and the receiving device information, reception of the real-time reproducible information by the receiving device, based on the traffic volume on the network and/or the processing capacity of the receiving device; and controlling, over the network, according to a reproduction instruction based upon the network traffic volume and/or the processing capacity of the receiving device, a display parameter of the content of the stream information to be reproduced in controlling the real-time reproduction of the stream information of the content at the receiving device, the display parameter related to one or more of a display layout comprising one or more of a display size or a display position, or a reproduction speed, or an image quality comprising one or more of a number of display colors, a lightness or a chroma, or whether to superimpose the content with another content, or sound related to one or more of whether to reproduce a sound, whether to synthesize a sound with another sound, specifying a sound volume, or voice/sound quality information, or prohibiting and/or permitting another external control at the receiving device of the display parameter, wherein the distribution instruction comprises editing the content of the real-time reproducible stream information reducing a display size of the content, based upon the traffic volume on the network and/or the processing capacity of the receiving device.

* * * * *

UNITED STATES PATENT AND TRADEMARK OFFICE
CERTIFICATE OF CORRECTION

| | | |
|---|---|---|
| PATENT NO. | : 7,398,320 B1 | Page 1 of 1 |
| APPLICATION NO. | : 09/534403 | |
| DATED | : July 8, 2008 | |
| INVENTOR(S) | : Yu Minakuchi et al. | |

It is certified that error appears in the above-identified patent and that said Letters Patent is hereby corrected as shown below:

Column 46, Line 9, after "claim," delete "further comprising:".

Column 46, Line 47, change "realtime" to --real-time--.

Column 46, Line 49, after "more of" insert --a--.

Column 46, Line 61, change "realtime" to --real-time--.

Signed and Sealed this

Eleventh Day of May, 2010

David J. Kappos
*Director of the United States Patent and Trademark Office*